US012775629B2

(12) United States Patent
Kuntz

(10) Patent No.: US 12,775,629 B2
(45) Date of Patent: Oct. 27, 2026

(54) TIME SERIES MATCHING OF RAW SPECTRAL VECTOR DATA

(71) Applicant: Thermo Scientific Portable Analytical Instruments Inc., Tewksbury, MA (US)

(72) Inventor: David Micah Kuntz, Ann Arbor, MI (US)

(73) Assignee: Thermo Scientific Portable Analytical Instruments Inc., Tewksbury, MA (US)

(*) Notice: Subject to any disclaimer, the term of this patent is extended or adjusted under 35 U.S.C. 154(b) by 0 days.

(21) Appl. No.: 19/172,024

(22) Filed: Apr. 7, 2025

(65) Prior Publication Data

US 2025/0321973 A1 Oct. 16, 2025

Related U.S. Application Data

(60) Provisional application No. 63/633,397, filed on Apr. 12, 2024.

(51) Int. Cl.
*G06F 16/25* (2019.01)

(52) U.S. Cl.
CPC .................................... *G06F 16/25* (2019.01)

(58) Field of Classification Search
None
See application file for complete search history.

(56) References Cited

U.S. PATENT DOCUMENTS

2008/0065334 A1* 3/2008 Duong .................... G06F 16/90
2015/0139445 A1* 5/2015 Kitazawa ................ G06F 16/35
2015/0204789 A1* 7/2015 Akkus ..................... G06F 16/95
2019/0137338 A1* 5/2019 Webster .................. G06F 16/25
2021/0020276 A1* 1/2021 Da Costa Martins ....................... G06F 16/328
2021/0215610 A1* 7/2021 Robertson ............... G06F 16/38
2024/0168033 A1* 5/2024 O'Mahony-Hartnett .................... G06F 16/258
2026/0101926 A1* 4/2026 Minskoff ................ G06F 16/90

FOREIGN PATENT DOCUMENTS

CN 202661171 U 1/2013
KR 10-2006-0024318 A 3/2006

OTHER PUBLICATIONS

Optuna "Optimize Your Optimization: An open source hyperparameter optimization framework to automate hyperparameter search" Optuna, https://optuna.org/, Last Accessed Mar. 31, 2025, 8 pages.
Mlflow "ML and GenAI made simple" mlflow, https://mlflow.org/, Last Accessed Apr. 7, 2025, 10 pages.

(Continued)

*Primary Examiner* — Son T Hoang
(74) *Attorney, Agent, or Firm* — Amin, Turocy & Watson, LLP

(57) ABSTRACT

Chemical interaction is monitored, such as employing data output from a Raman spectroscopy system relative to a composition undergoing the chemical interaction in a bioreactor, including identifying a raw dataset corresponding to a chemical interaction, and generating matched data comprising a set of matches between time series data, corresponding to a range of time over which the chemical interaction was observed, and chemical interaction data comprised by the raw dataset.

20 Claims, 20 Drawing Sheets

(56) References Cited

OTHER PUBLICATIONS

Joblib "Joblib: running Python functions as pipeline jobs" Joblib, https://joblib.readthedocs.io/en/stable/, Last Accessed Mar. 31, 2025, 4 pages.
International Search Report and Written Opinion received for PCT Application Serial No. PCT/US2025/024078 dated Jul. 30, 2025, 15 pages.
Wu et al., "Simulation and Quantitative Analysis of Raman Spectra in Chemical Processes with Autoencoders", Chemometrics and Intelligent Laboratory Systems, vol. 248, No. 105119, Mar. 27, 2024, 10 pages.
Smedt et al., "Process Model Forecasting and Change Exploration Using Time Series Analysis of Event Sequence Data", Data & Knowledge Engineering, vol. 145, No. 102145, Jan. 25, 2023, 17 pages.
Guha et al., "Correlating Synchronous and Asynchronous Data Streams", Proceedings of the Ninth ACM SIGKDD International Conference on Knowledge Discovery and Data Mining, Aug. 27, 2003, pp. 529-534.
Fang et al., "Online Monitoring of High-dimensional Binary Data Streams with Application to Extreme Weather Surveillance", Journal of Applied Statistics, vol. 49, No. 16, 2022, pp. 4122-4136.

* cited by examiner

TIME SERIES MATCHING OF RAW SPECTRAL VECTOR DATA

CROSS-REFERENCE TO RELATED APPLICATIONS

This application claims priority to and the benefit of U.S. Provisional Application No. 63/633,397, entitled "TIME SERIES MATCHING OF RAW SPECTRAL VECTOR DATA," which was filed on Apr. 12, 2024. The entirety of the aforementioned application is hereby incorporated herein by reference.

BACKGROUND

Scientific instruments for use in chemical interaction analysis of a chemical interaction can aid in determining ongoing changes to one or more constituents of a composition undergoing the chemical interaction. In one or more examples, a scientific instrument can provide evaluation of raw data associated with a chemical interaction, such as metabolite and/or spectral data, among others. Evaluation of the raw data can comprise one or more modifications of the raw data.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

SUMMARY

Figure 1:
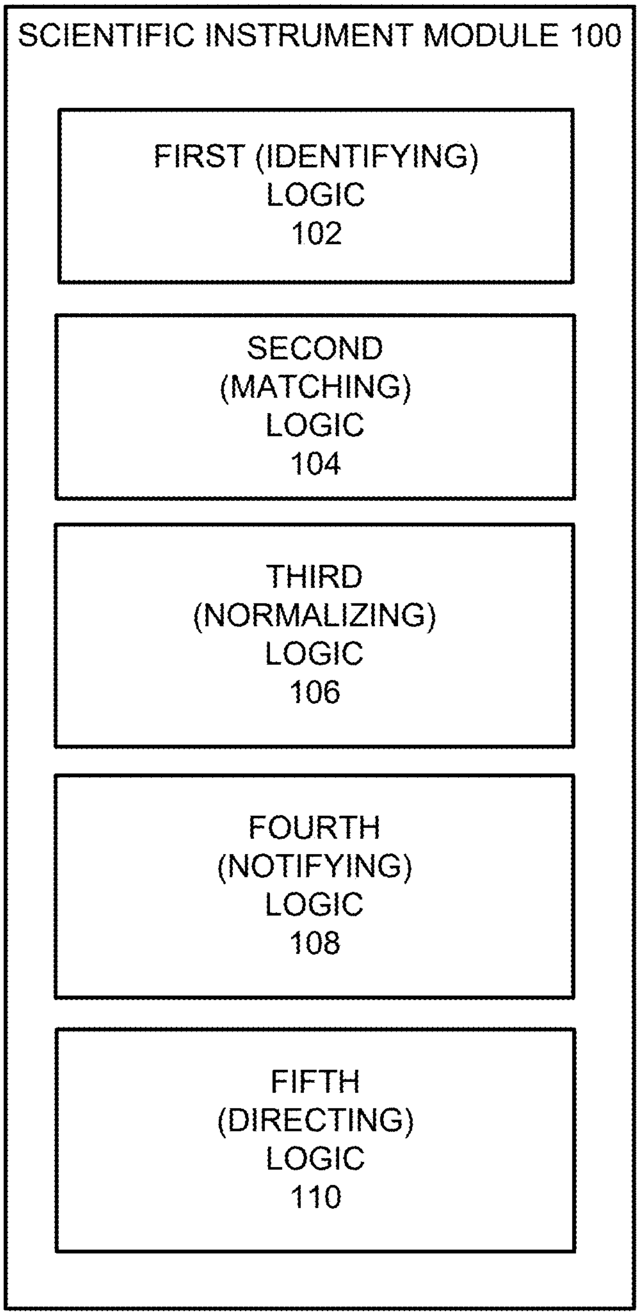
FIG. 1 illustrates a block diagram of an example scientific instrument for performing one or more operations, in accordance with one or more embodiments described herein.

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide a process for chemical interaction monitoring, such as employing data output from a Raman spectroscopy system relative to a composition undergoing the chemical interaction in a containment vessel, such as a bioreactor.

In accordance with an embodiment, a system can comprise a memory that stores computer executable components, and a processor that executes the computer executable components. The computer executable components can comprise an identifying component that identifies a raw dataset corresponding to a chemical interaction, and a matching component that generates matched data comprising a set of matches between time series data, corresponding to a range of time over which the chemical interaction was observed, and chemical interaction data comprised by the raw dataset.

In accordance with another embodiment, a computer-implemented method can comprise identifying, by a system operatively coupled to a processor, a raw dataset corresponding to a chemical interaction, and generating, by the system, matched data comprising a set of matches between time series data, corresponding to a range of time over which the chemical interaction was observed, and chemical interaction data comprised by the raw dataset.

In accordance with still another embodiment, a computer program product facilitates a process for chemical interaction monitoring, the program instructions executable by a processor to cause the processor to identify, by the processor, a raw dataset of spectral vector data corresponding to a chemical interaction, and generate, by the processor, matched data comprising a set of matches between time series data, corresponding to a range of time over which the chemical interaction was observed, and chemical interaction data comprised by the spectral vector data of the raw dataset.

In accordance with another embodiment, a system can comprise a memory that stores computer executable components; and a processor that executes the computer executable components stored in the memory, wherein the computer executable components comprise an identifying component that identifies a raw dataset corresponding to a chemical interaction, and a matching component that generates matched data, the matched data comprising a set of matches between time series data and chemical interaction data, wherein the time series data corresponds to a range of time over which the chemical interaction was observed, and wherein the chemical interaction data is comprised by at least a portion of the raw dataset.

In accordance with another embodiment, a computer-implemented method can comprise identifying, by a system operatively coupled to a processor, a raw dataset corresponding to a chemical interaction, and generating, by the system, matched data comprising a set of matches between time series data and chemical interaction data, wherein the time series data corresponds to a range of time over which the chemical interaction was observed, and wherein the chemical interaction data is comprised by at least a portion of the raw dataset.

In accordance with still another embodiment, a computer program product facilitates a process for chemical interaction monitoring, the program instructions executable by a processor to cause the processor to identify, by the processor, a raw dataset of spectral vector data corresponding to a chemical interaction, generate, by the processor, matched data comprising a set of matches between time series data and chemical interaction data, wherein the time series data corresponds to a range of time over which the chemical interaction was observed, and wherein the chemical interaction data is comprised by at least a portion of the spectral vector data of the raw dataset.

The one or more embodiments disclosed herein can achieve improved performance relative to existing approaches. For example, with respect to large quantities of spectral vector data, or even continuous and/or nearly continuous writing of spectral vector data, such raw data can be automatically organized to match corresponding time series data. That is, manual matching of data and correlating of time changes, spectral vector data gaps, and/or the like can instead be performed automatically and more rapidly allowing for in process (e.g., real-time) adjustment to the chemical interaction.

That is, the one or more embodiments disclosed herein can allow for active monitoring and/or actively adjusting and/or suggesting of adjusting of a chemical interaction being monitored (e.g., corresponding to the spectral vector data), as compared to passive monitoring of low frequency based spectral vector data (e.g., limited, spaced apart data gathering and/or evaluation).

As a result of use of the one or more embodiments described herein, continuous data can be matched and evaluated prior to a negative change in the chemical interaction being monitored. That is, due to the automatic, fast, and efficient time series data matching performed by the one or more embodiments described herein, a chemical interaction trajectory can be proactively controlled rather than reactively controlled.

Using the one or more embodiments described herein, use of a specialized domain, or requirement for domain knowledge, to perform manual time series matching can be made moot due to that the raw data can be automatically organized to match corresponding time series data.

In one or more cases, the one or more embodiments described herein can provide artificial intelligence (AI) optimization for processing (e.g., including evaluating) the matched data resulting from the matching. This AI optimization can be streamlined relative to a specified chemical interaction through various processes comprising, but not limited to, subsetting of base data underlying the AI optimization and/or transfer training of a machine learning (ML) model, or other model type, being employed to facilitate the AI optimization.

DETAILED DESCRIPTION

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiment. Various additional operations can be performed, and/or described operations can be omitted in additional embodiments.

Turning now to the subject of material analysis and to the one or more embodiments described herein, a method of monitoring a chemical interaction, such as taking place within a containment vessel (e.g., with the chemical interaction being non-directly-viewable) can be to employ spectral vector data for the chemical interaction to better understand changes occurring that define the interaction. These changes can be to a metabolite (e.g., glucose, lactate, titer, etc.) and/or other constituent, and can comprise increase and/or reduction of one or more constituents.

It is noted that the term "chemical interaction" refers to "chemical" on the most basic level, such as comprising a composition, constituent, molecule, element, periodic element, atom, atomic component, cell, organism, and/or the like. Thus, a biochemical, physiochemical, biological, purely chemical, in vivo, in vitro, in situ, or other similar reaction can comprise a "chemical interaction" as used herein. Accordingly, the one or ore embodiments described herein can be applicable to, without being limited there to, a reaction, cell culturing process, chemical composition process, mixing process, growth process, and/or the like related to an industrial, commercial, chemical production, pharmaceutical, food processing or other industry, without being limited thereto.

Additionally, the "chemical interaction" can occur in a pre-processing step, growth step, culturing step, purification step, and/or the like. For example, relative to a cell culture operation for a pharmaceutical ingredient, various processes comprised by the operation can be a cell culturing process, downstream cell collection process, and/or downstream cell purification process.

Further, a vessel can be any suitable container employed to hold and/or contain the chemical interaction in a closed or open environment. For example, a bioreactor can be used to produce an active pharmaceutical ingredient in cell cultures.

In this example and various other example, a production process can be expensive and can take weeks or even months. A measurement of constituent levels (e.g., concentrations) can be conventionally taken multiple times a day.

In one or more embodiments, to evaluate changes in such concentrations, an excitation beam can be applied to the contents of the chemical interaction vessel to allow for spectroscopy readings, such as Raman spectroscopy readings (to be further described below relative to FIGS. 5-9), to be collected.

Resulting raw spectral vector data comprised by a raw dataset can be matched to time series data to allow for accurate correlation of order of changes within the composition caused by the ongoing chemical interaction. In one or more cases, the time series data can be independently measured. In existing methods, these few readings can be manually correlated to time series data to allow for accurate correlation of order of changes within the composition caused by the ongoing chemical interaction.

It is noted that any reference to "raw dataset" can correspond to data other than spectral vector data, such as any other data resulting from an observation of the chemical interaction, including, but not limited to, pH data, acidity data, color data, and/or the like.

In existing frameworks, the previously mentioned passive monitoring is often low in measured readings due to being low frequency based (e.g., limited and/or spaced apart measurement execution and/or evaluation is performed). As a result, changes in the chemical interaction can be missed due to their occurrence between times when measurements (e.g., daily measurements) are taken. This can lead to continuous reactive control (e.g., adjustment) to the chemical interaction with the vessel (e.g., a bioreactor). Further, such adjustments are existingly manually controlled due to lack of need for more efficient and/or quicker manual control, such as of valve controls corresponding to the vessel.

One existing solution could be to increase the frequency of measurement execution. However, because each measurement occurrence can result in raw data comprising a plurality of aspects (e.g., spectral vector data comprising a plurality of spectral vector measurements), increasing frequency of measurement execution can fail existingly due to an inability to timely match the spectral vector data to corresponding time series data. That is, existing manual methods for time series data matching can be slow, inefficient and manual, which would result in continuous changes in the chemical interaction occurring before the spectral vector data could be time series matched and subsequently evaluated. Indeed, due to these one or more inabilities and/or deficiencies of existing frameworks, it can be difficult or impossible to obtain timely actionable insights regarding the chemical interaction. This can lead to an exacerbation of what is already continuous reactive control (e.g., adjustment) to the chemical interaction with the vessel (e.g., a bioreactor).

Therefore, to account for one or more inabilities and/or deficiencies of existing frameworks, one or more embodiments are described herein that can employ a unique spectral vector data matching and evaluating framework that can be capable of processing increased volumes of raw data (e.g., spectral vector data), such as continually generated spectral vector data.

In connection therewith, the one or more embodiments described herein can rapidly and automatically provide the matching and evaluation of the spectral vector data. As a result, the continuous data can be matched to corresponding time series data and subsequently evaluated prior to a continued negative change or negative change in the chemical interaction being monitored. As used herein, "negative" can mean undesired. That is, due to the automatic, fast, and efficient time series data matching performed by the one or more embodiments described herein, a chemical interaction trajectory can be proactively controlled rather than reactively controlled (e.g., as in existing frameworks). In this manner, control of the trajectory can include, but is not limited to, optimization of yield, optimization of cell feeding, reduction in reactant introduction, etc.

In addition, use of the one or more embodiments described herein can allow for customized time series matching to account for an instance of the data gathering device (e.g., spectroscopy device) being offline or due to a failure of the data gathering device (e.g., an emission component failing to activate). Customization of time series matching further can allow for labeling and handling of time series matching for different time zones, handling of daylight savings time. Further, customization of time series matching can allow for identification of skewed data due to cosmic emission and/or to provide grouped results (e.g., averaging of one or more adjacent/consecutive data results).

Also, in connection with the one or more embodiments described herein, automatic time series matching can moot issues related to existing frameworks such as a need to have software-based and/or domain-based knowledge to manually perform time series matching. Accordingly, the one or more embodiments described herein can be employed by non-programmer entities and field personnel entities alike.

In one or more embodiments, one or more systems described herein can be employed as an executable (e.g., an .exe or other application) using a programming-software and/or-language of the device on which the executable is employed.

Discussion next turns to a general discussion of one or more scientific instrument systems disclosed herein, as well as related methods, computing devices, and computer-readable media. For example, in one or more embodiments, a system can comprise a memory that stores computer executable components and a processor that executes the computer executable components stored in the memory. The computer executable components can comprise an identifying component that identifies a raw dataset corresponding to a chemical interaction, and a matching component that generates matched data comprising a set of matches between time series data, corresponding to a range of time over which the chemical interaction was observed, and chemical interaction data comprised by the raw dataset.

The one or more embodiments disclosed herein can achieve improved performance relative to existing approaches. For example, based on application of an automatic framework described herein, matching and evaluation of the spectral vector data can be rapidly and automatically provided. In connection therewith, use of the unique approach can allow for increase of information being gathered and subsequently being used to evaluate and/or control a chemical interaction, which was not possible using existing frameworks.

Moreover, an embodiment described herein can beneficially provide chemical interaction monitoring (e.g., including the spectral vector data matching, matched data evaluation, and generation of output based on the matched data evaluation) for plural targets at least partially in parallel with one another. For example, plural increased quantities of spectral vector data can be processed (e.g., including the spectral vector data matching, matched data evaluation, and/or generation of output based on the matched data evaluation) from plural chemical interactions at least partially in parallel with one another by a same chemical interaction monitoring system and/or separate chemical interaction monitoring system.

The embodiments disclosed herein thus can provide improvements to scientific instrument technology (e.g., improvements in the computer technology supporting such scientific instruments, among other improvements), which can be employed in various fields including pharmaceutical production, cell culture production, and/or other bio-production and/or related spectroscopy, without being limited thereto.

Various ones of the embodiments disclosed herein can improve upon existing approaches to achieve the technical advantages of high information gathering, matching and/or evaluation. That is, use of the chemical interaction monitoring framework provided herein can greatly reduce loss of chemical interaction data (e.g., due to failure to obtain and/or evaluate the data quickly enough). In connection therewith, use of the chemical interaction monitoring framework provided herein can greatly reduce reactive approaches to chemical interaction control.

Such technical advantages are not achievable by routine and/or existing approaches, and all user entities of systems including such embodiments can benefit from these advantages (e.g., by assisting the user entity in the performance of a technical task, such as the spectral vector data matching, matched data evaluation, and/or generation of output based on the matched data evaluation discussed herein).

The technical features of the embodiments disclosed herein (e.g., spectral vector data matching, matched data evaluation, and/or generation of output based on the matched data evaluation) are thus decidedly unconventional in various fields including pharmaceutical production, cell culture production, and/or other bio-production and/or related spectroscopy, without being limited thereto, as are combinations of the features of the embodiments disclosed herein.

As discussed further herein, various aspects of the embodiments disclosed herein can improve the functionality of a computer itself. That is, the computational and user interface features disclosed herein do not involve only the collection and comparison of information but instead apply new analytical and technical techniques to change the operation of the computer-analysis of a chemical interaction. For example, based on the spectral vector data having been time series matched, an on subsequent processing (e.g., evaluation) of the matched data, proactive and automatic control of the chemical interaction can be performed. That is, based at least on these processes, computer functionality related to the proactive and automatic control of the chemical interaction can be allowed for in the first instance, thus improving the ability of the computer to function in the first instance. As such, a non-limiting system described herein, comprising a chemical interaction monitoring system, can be self-improving.

Indeed, based on ability to time series match as quickly as new data is generated, one or more new actionable insights (e.g., previously unavailable using existing frameworks) can be obtained for the system and/or for a user entity. For example, based on additional data yields having been made possible, rates of chemical interactions can be observed, such as rates that cells consume glucose, interpolation between varying data-based measurements and/or the like.

The present disclosure thus introduces functionality that neither an existing computing device, nor a human, could perform. Rather, such existing computing devices are both inefficient and ineffective at spectral vector data matching, matched data evaluation, and/or generation of output based on the matched data evaluation related to high frequency data gathering (e.g., continuous data gathering), resulting in loss of data (due to not gather the data in the first place) and/or resulting in slow, inefficient and costly reactive control of a corresponding chemical interaction. Therefore, it is not practical to operate within the confines of existing approaches.

Accordingly, the embodiments of the present disclosure can serve any of a number of technical purposes, such as controlling a specific technical system or process; determining from measurements how to control a machine; digital audio, image, or video enhancement or analysis; separation of material sources in a mixed signal; generating data for reliable and/or efficient transmission or storage; providing estimates and confidence intervals for material samples; or providing a faster processing of sensor data. In particular, the present disclosure provides technical solutions to technical problems, including, but not limited to, spectral vector data matching, matched data evaluation, and/or generation of output based on the matched data evaluation, resulting in a faster, more thorough and/or more efficient processing of high quantities of spectra vector data corresponding to an ongoing chemical interaction (e.g., continually ongoing, including after each instance of data gathering).

The embodiments disclosed herein thus provide improvements to chemical interaction monitoring technology (e.g., improvements in the computer technology supporting chemical interaction monitoring, among other improvements).

As used herein, the phrase “based on” should be understood to mean “based at least in part on,” unless otherwise specified.

As used herein, the term “component” can refer to an atomic element, molecular element, phase of an atomic or molecular element, or combination thereof.

As used herein, the term “data” can comprise metadata.

As used herein, the terms “entity,” “requesting entity,” and “user entity” can refer to a machine, device, component, hardware, software, smart device, party, organization, individual and/or human.

One or more embodiments are now described with reference to the drawings, where like referenced numerals are used to refer to like drawing elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning now in particular to the one or more figures, and first to FIG. 1, illustrated is a block diagram of a scientific instrument module 100 for performing material analysis operations using an apodization technique, in accordance with various embodiments described herein. The scientific instrument module 100 can be implemented by circuitry (e.g., including electrical and/or optical components), such as a programmed computing device. The logic of the scientific instrument module 100 can be included in a single computing device or can be distributed across multiple computing devices that are in communication with each other as appropriate. Examples of computing devices that can, singly or in combination, implement the scientific instrument module 100 are discussed herein with reference to the computing device 400 of FIG. 4, and examples of systems of interconnected computing devices, in which the scientific instrument module 100 can be implemented across one or more of the computing devices, is discussed herein with reference to the scientific instrument system 1800 of FIG. 18.

The scientific instrument module 100 can include first logic 102, second logic 104, third logic 106, fourth logic 108 and fifth logic 110. As used herein, the term “logic” can include an apparatus that is to perform a set of operations associated with the logic. For example, any of the logic elements included in the module 100 can be implemented by one or more computing devices programmed with instructions to cause one or more processing devices of the computing devices to perform the associated set of operations. In a particular embodiment, a logic element can include one or more non-transitory computer-readable media having instructions thereon that, when executed by one or more processing devices of one or more computing devices, cause the one or more computing devices to perform the associated set of operations. As used herein, the term “module” can refer to a collection of one or more logic elements that, together, perform a function associated with the module. Different ones of the logic elements in a module can take the same form or can take different forms. For example, some logic in a module can be implemented by a programmed general-purpose processing device, while other logic in a module can be implemented by an application-specific integrated circuit (ASIC). In another example, different ones of the logic elements in a module can be associated with different sets of instructions executed by one or more processing devices. A module can omit one or more of the logic elements depicted in the associated drawing; for example, a module can include a subset of the logic elements depicted in the associated drawing when that module is to perform a subset of the operations discussed herein with reference to that module.

The first logic 102 can receive, find, locate, download, request, obtain and/or otherwise identify spectral vector data having been generated relative to a chemical interaction, such as by a spectroscopy analysis system (e.g., comprising analyzer 500 of FIG. 5, to be discussed below). In one or more embodiments, the first logic 102 can n receive, find, locate, download, request, obtain and/or otherwise identify time series data corresponding to a time range over which the spectral vector data was generated. That is, the first logic 102 can identify data for being processed and for subsequent use in generating an output to control the chemical interaction being monitored.

The second logic 104 can match the spectral vector data and the time series data to one another to allow for correlation and understanding of the spectral vector data and the chemical interaction aspects it represents. That is, the second logic 104 can cause time series data matching of the spectral vector data.

The third logic 106 can normalize matched data resulting from the second logic 104. This normalizing can comprise a plurality of processes including averaging together two or more spectral vectors, defining a gap in the spectral vector data, and/or removing outlier spectral vector data, where the outliers and first evaluated and identified as part of the normalizing. That is, the third logic 106 also can comprise at least partial evaluating of the matched data, and thus of the spectral vector data.

The fourth logic 108 can generate one or more notifications, such as corresponding to progress of a constituent involved in the chemical interaction, such as including a comparison of the progress to a progress threshold. This generation can be based at least on the normalizing performed by the third logic 106.

The fifth logic 110 can generate a suggestion and/or direction for controlling the chemical interaction based at least on the normalizing performed by the third logic 106.

Figure 2:
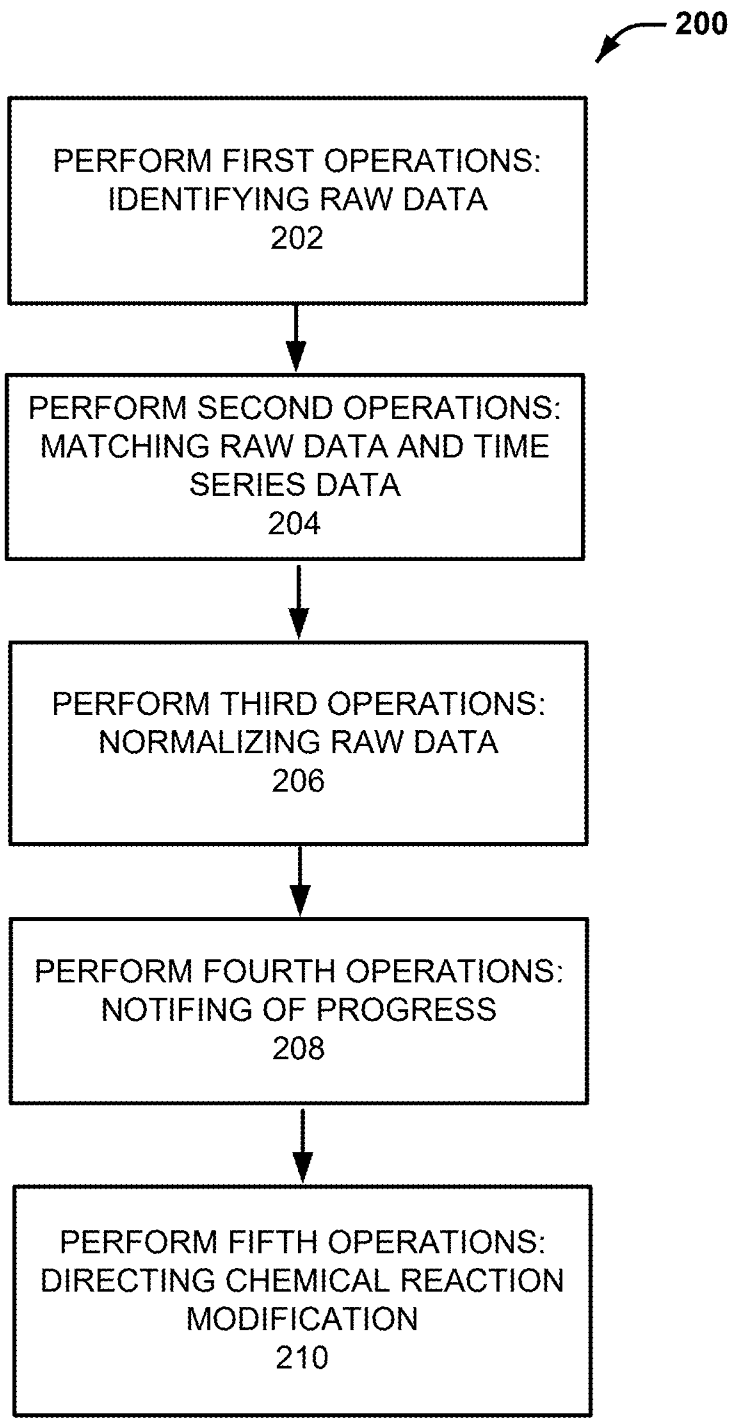
FIG. 2 illustrates a flow diagram of an example method of performing operations using the scientific instrument of FIG. 1, in accordance with one or more embodiments described herein.

FIG. 2 illustrates a flow diagram of a method 200 of performing operations, by the scientific instrument module 100, in accordance with various embodiments. Although the operations of the method 200 can be illustrated with reference to particular embodiments disclosed herein (e.g., the scientific instrument module 100 discussed herein with reference to FIG. 1, the GUI 300 discussed herein with reference to FIG. 3, the computing device 400 discussed herein with reference to FIG. 4, and/or the scientific instrument system 1800 discussed herein with reference to FIG. 18), the method 200 can be used in any suitable setting to perform any suitable operations. Operations are illustrated once each and in a particular order in FIG. 2, but the operations can be reordered and/or repeated as desired and appropriate (e.g., different operations performed can be performed in parallel, as suitable).

At 202, first operations can be performed. For example, the first logic 102 of the module 100 can perform the first operations 202. The first operations 202 can include identifying spectral vector data, having been generated relative to a chemical interaction, such as by a spectroscopy analysis system, and time series data corresponding to a time range over which the spectral vector data was generated.

At 204, second operations can be performed. For example, the second logic 104 of the module 100 can perform the second operations 204. The second operations 204 can comprise matching the spectral vector data and the time series data to one another to allow for correlation and understanding of the spectral vector data and the chemical interaction aspects it represents.

At 206, third operations can be performed. For example, the third logic 106 of the module 100 can perform the third operations 206. The third operations 206 can comprise normalizing of the matched data. As described at least above, and also further below, this normalizing can comprise a plurality of processes including averaging together two or more spectral vectors, defining a gap in the spectral vector data, and/or removing outlier spectral vector data, where the outliers and first evaluated and identified as part of the normalizing.

At 208, fourth operations can be performed. For example, the fourth logic 108 of the module 100 can perform the fourth operations 208. The fourth operations 208 can comprise generating one or more notifications, such as corresponding to progress of a constituent involved in the chemical interaction, such as including a comparison of the progress to a progress threshold.

At 210, fifth operations can be performed. For example, the fifth logic 110 of the module 100 can perform the fifth operations 210. The fifth operations 210 can comprise generating a suggestion and/or direction for controlling the chemical interaction. For example, a suggestion can be sent to and/or made available to a device associated with an administrating entity monitoring the chemical interaction. For another example, a control of the chemical interaction, such as activation of a flow valve for a vessel containing the chemical interaction, can be sent to and/or made available to a system controlling and/or communicatively coupled to the vessel containing the chemical interaction.

The scientific instrument methods disclosed herein can include interactions with a user entity (e.g., via the user local computing device 1800 discussed herein with reference to FIG. 21). These interactions can include providing information to the user entity (e.g., information regarding the operation of a scientific instrument such as the scientific instrument 1810 of FIG. 18, information regarding a sample being analyzed or other test or measurement performed by a scientific instrument, information retrieved from a local or remote database, or other information) or providing an option for a user entity to input commands (e.g., to control the operation of a scientific instrument such as the scientific instrument 1810 of FIG. 18, or to control the analysis of data generated by a scientific instrument), queries (e.g., to a local or remote database), or other information. In some embodiments, these interactions can be performed through a graphical user interface (GUI) that includes a visual display on a display device (e.g., the display device 410 discussed herein with reference to FIG. 4) that provides outputs to the user entity and/or prompts the user entity to provide inputs (e.g., via one or more input devices, such as a keyboard, mouse, trackpad, or touchscreen, included in the other I/O devices 412 discussed herein with reference to FIG. 4). The scientific instrument system 1800 disclosed herein can include any suitable GUIs for interaction with a user entity.

Figure 3:
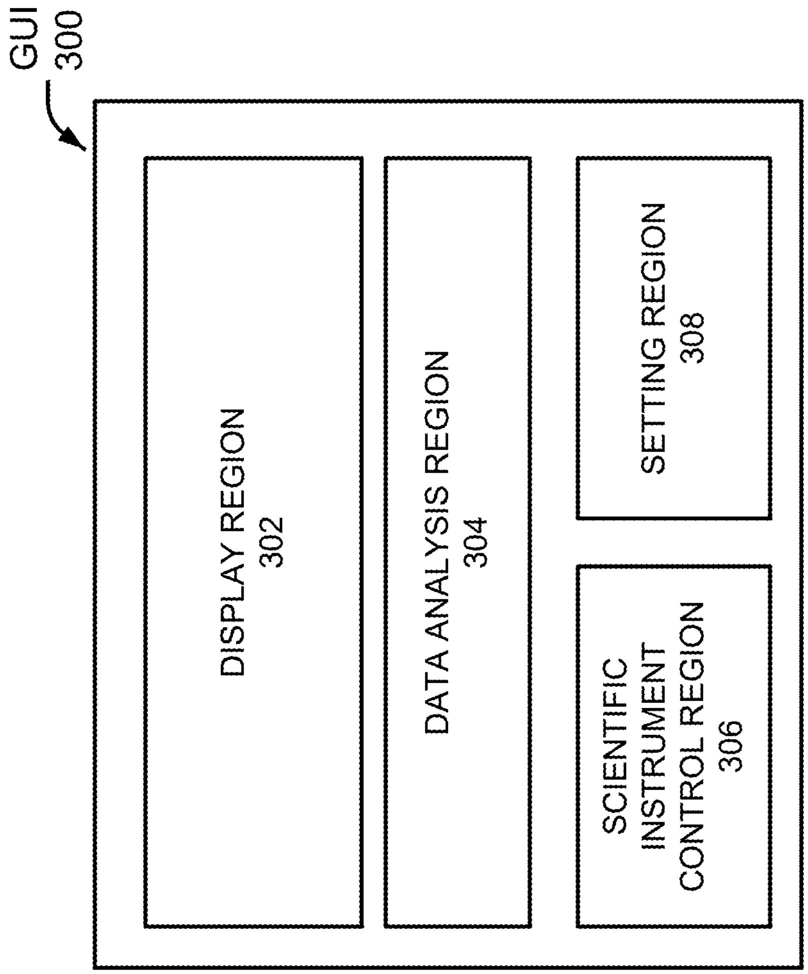
FIG. 3 illustrates a graphical user interface (GUI) that can be used in the performance of one or more of the methods described herein, in accordance with one or more embodiments described herein.

Turning next to FIG. 3, depicted is an example GUI 300 that can be used in the performance of one or more of the methods described herein, in accordance with various embodiments described herein. As noted above, the GUI 300 can be provided on a display device (e.g., the display device 410 discussed herein with reference to FIG. 4) of a computing device (e.g., the computing device 400 discussed herein with reference to FIG. 4) of a scientific instrument system (e.g., the scientific instrument system 1800 discussed herein with reference to FIG. 18), and a user entity can interact with the GUI 300 using any suitable input device (e.g., any of the input devices included in the other I/O devices 412 discussed herein with reference to FIG. 4) and input technique (e.g., movement of a cursor, motion capture, facial recognition, gesture detection, voice recognition, actuation of buttons, etc.).

The GUI 300 can include a data display region 302, a data analysis region 304, a scientific instrument control region 306, and a settings region 308. The particular number and arrangement of regions depicted in FIG. 3 is merely illustrative, and any number and arrangement of regions, including any desired features thereof, can be included in a GUI 300.

Figure 18:
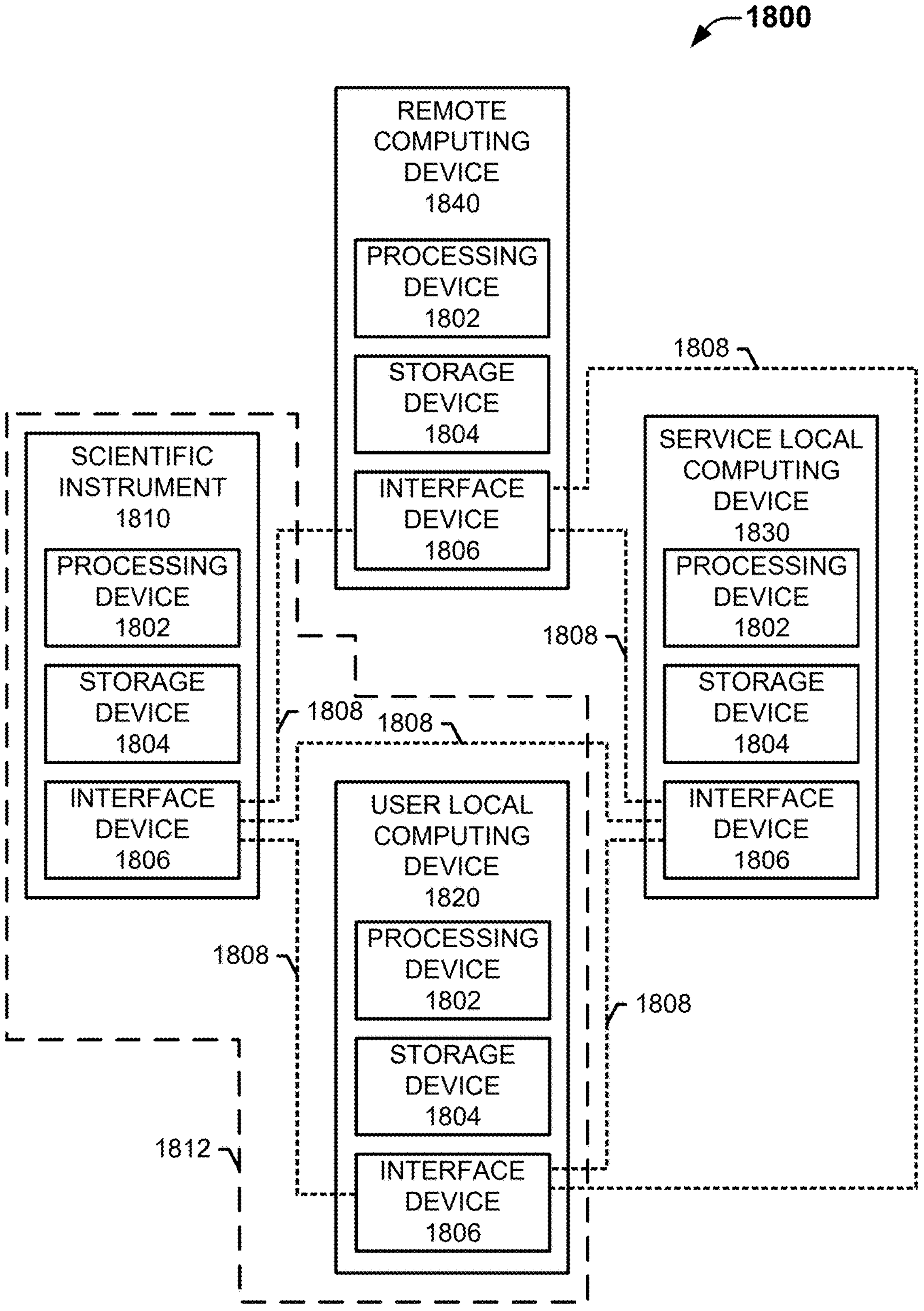
FIG. 18 illustrates a block diagram of an example scientific instrument system in which one or more of the methods described herein can be performed, in accordance with one or more embodiments described herein.

The data display region 302 can display data generated by a scientific instrument (e.g., the scientific instrument 1810 discussed herein with reference to FIG. 18). For example, the data display region 302 can display one or more output results which can comprise text, graphs, notification, charts, matrices and/or spectra, without being limited thereto. For example, the data display region 302 can display the spectral vector data generated by the spectroscopy analysis system (e.g., comprising analyzer 500 of FIG. 5, to be discussed below).

The data analysis region 304 can display the results of data analysis (e.g., the results of analyzing the data illustrated in the data display region 302 and/or other data). For example, the data analysis region 304 can display one or more of the output results. In one or more cases, the data analysis region 304 can display a list, flow chart or other schematic of acquisition actions taken and/or recommended relative to an experiment. For example, the data analysis region 304 can display the matched data resulting from the second operations 204, the normalized data resulting from the third operations 206, the notification resulting from the fourth operations 208 and/or the suggestion and/or direction resulting from the fifth operations 210.

In one or more embodiments, the data display region 302 and the data analysis region 304 can be combined in the GUI 300 (e.g., to include data output from a scientific instrument, and some analysis of the data, in a common graph or region).

The scientific instrument control region 306 can include options that allow the user entity to control a scientific instrument (e.g., the scientific instrument 1810 discussed herein with reference to FIG. 18). For example, the scientific instrument control region 306 can include one or more controls for inputting one or more processing thresholds, time series data aspects, and/or the like.

Figure 4:
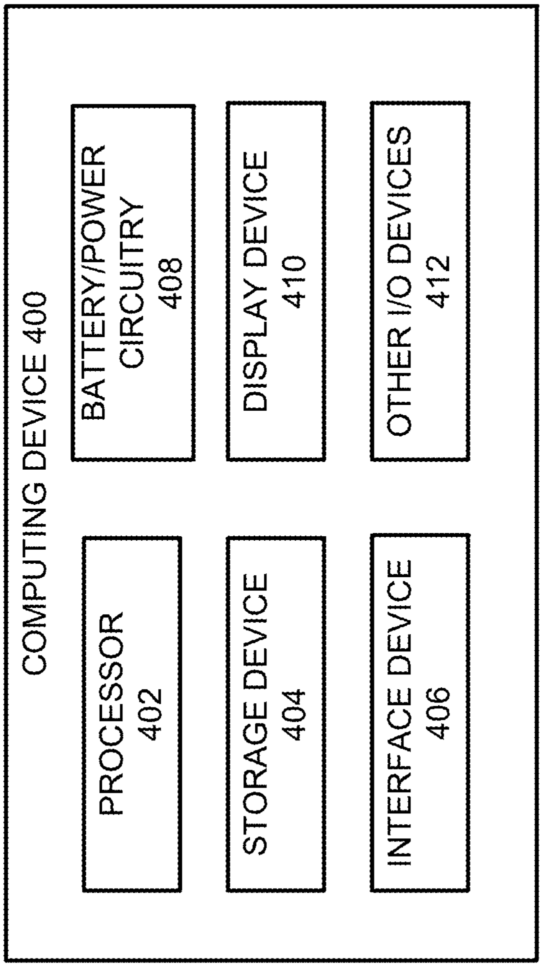
FIG. 4 illustrates a block diagram of an example computing device that can perform one or more of the methods disclosed herein, in accordance with one or more embodiments described herein.

The settings region 308 can include options that allow the user entity to control the features and functions of the GUI 300 (and/or other GUIs) and/or perform common computing operations with respect to the data display region 302 and data analysis region 304 (e.g., saving data on a storage device, such as the storage device 404 discussed herein with reference to FIG. 4, sending data to another user entity, labeling data, etc.). For example, the settings region 308 can include one or more options to alter color, fill or format of illustrations, such as an illustration of FIG. 10, to be described below.

As noted above, the scientific instrument module 100 can be implemented by one or more computing devices. Accordingly, discussion next turns to FIG. 4, which illustrates a block diagram of a computing device 400 that can perform some or all of the scientific instrument methods disclosed herein, in accordance with various embodiments. In one or more embodiments, the scientific instrument module 100 can be implemented by a single computing device 400 or by multiple computing devices 400. Further, as discussed below, a computing device 400 (or multiple computing devices 400) that implements the scientific instrument module 100 can be part of one or more of the scientific instrument 1810, the user local computing device 1820, the service local computing device 1830, or the remote computing device 1840 of FIG. 18.

The computing device 400 of FIG. 4 is illustrated as having a number of components, but any one or more of these components can be omitted or duplicated, as suitable for the application and setting. As illustrated, these components can include one or more of a processor 402, storage device 404, interface device 406, battery/power circuitry 408, display device 410 and other input/output (I/O) devices 412, as will be described below.

In one or more embodiments, one or more of the components included in the computing device 400 can be attached to one or more motherboards and enclosed in a housing (e.g., including plastic, metal, and/or other materials). In one or more embodiments, some these components can be fabricated onto a single system-on-a-chip (SoC) (e.g., an SoC can include one or more processors 402 and one or more storage devices 404). Additionally, in one or more embodiments, the computing device 400 can omit one or more of the components illustrated in FIG. 4. In one or more embodiments, the computing device 400 can include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 400 can omit a display device 410, but can include display device interface circuitry (e.g., a connector and driver circuitry) to which a display device 410 can be coupled.

The computing device 400 can include the processor 402 (e.g., one or more processing devices). As used herein, the term "processing device" can refer to any device or portion of a device that processes electronic data from registers and/or memory to transform that electronic data into other electronic data that can be stored in registers and/or memory. The processor 402 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 400 can include a storage device 404 (e.g., one or more storage devices). The storage device 404 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In one or more embodiments, the storage device 404 can include memory that shares a die with a processor 402. In such an embodiment, the memory can be used as cache memory and can include embedded dynamic random-access memory (eDRAM) or spin transfer torque magnetic random-access memory (STT-MRAM), for example. In one or more embodiments, the storage device 404 can include non-transitory computer readable media having instructions thereon that, when executed by one or more processing devices (e.g., the processor 402), cause the computing device 400 to perform any appropriate ones of or portions of the methods disclosed herein.

The computing device 400 can include an interface device 406 (e.g., one or more interface devices 406). The interface device 406 can include one or more communication chips, connectors, and/or other hardware and software to govern communications between the computing device 400 and other computing devices. For example, the interface device 406 can include circuitry for managing wireless communications for the transfer of data to and from the computing device 400. The term "wireless" and its derivatives can be used to describe circuits, devices, systems, methods, techniques, communications channels, etc., that can communicate data through the use of modulated electromagnetic radiation through a nonsolid medium. The term does not imply that the associated devices do not contain any wires, although in one or more embodiments the associated devices might not contain any wires. Circuitry included in the interface device 406 for managing wireless communications can implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In one or more embodiments, circuitry included in the interface device 406 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In one or more embodiments, circuitry included in the interface device 406 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In one or more embodiments, circuitry included in the interface device 406 for managing wireless communications can operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In one or more embodiments, the interface device 406 can include one or more antennas (e.g., one or more antenna arrays) to receipt and/or transmission of wireless communications.

In one or more embodiments, the interface device 406 can include circuitry for managing wired communications, such as electrical, optical, or any other suitable communication protocols. For example, the interface device 406 can include circuitry to support communications in accordance with Ethernet technologies. In one or more embodiments, the interface device 406 can support both wireless and wired communication, and/or can support multiple wired communication protocols and/or multiple wireless communication protocols. For example, a first set of circuitry of the interface device 406 can be dedicated to shorter-range wireless communications such as Wi-Fi or Bluetooth, and a second set of circuitry of the interface device 406 can be dedicated to longer-range wireless communications such as global positioning system (GPS), EDGE, GPRS, CDMA, WIMAX, LTE, EV-DO, or others. In one or more embodiments, a first set of circuitry of the interface device 406 can be dedicated to wireless communications, and a second set of circuitry of the interface device 406 can be dedicated to wired communications.

The computing device 400 can include battery/power circuitry 408. The battery/power circuitry 408 can include one or more energy storage devices (e.g., batteries or capacitors) and/or circuitry for coupling components of the computing device 400 to an energy source separate from the computing device 400 (e.g., AC line power).

The computing device 400 can include a display device 410 (e.g., multiple display devices). The display device 410 can include any visual indicators, such as a heads-up display, a computer monitor, a projector, a touchscreen display, a liquid crystal display (LCD), a light-emitting diode display, or a flat panel display.

The computing device 400 can include other input/output (I/O) devices 412. The other I/O devices 412 can include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 400, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 400 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

Figure 9:
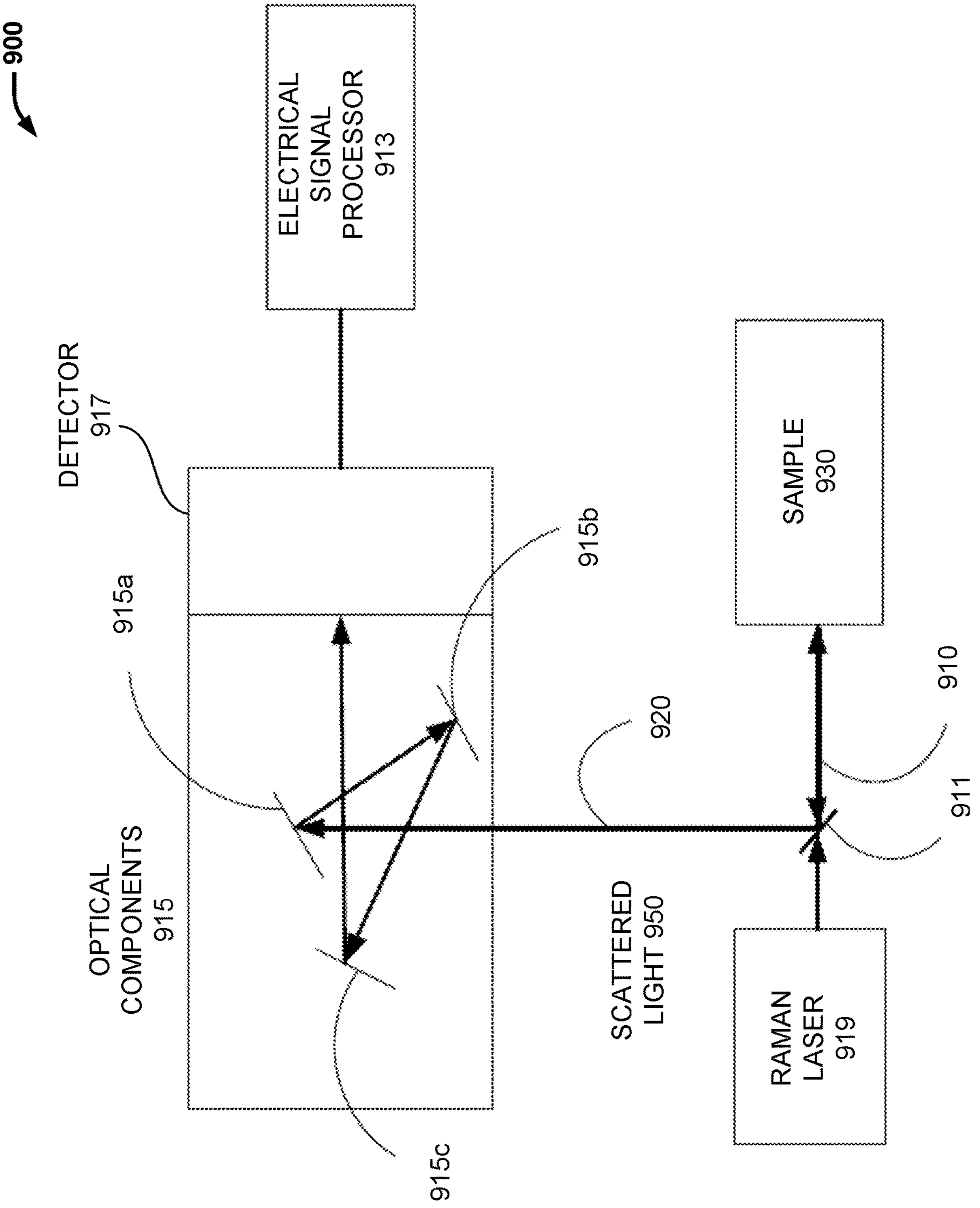
FIG. 9 provides an exemplary depiction of yet another implementation of an optical architecture of the analyzer of FIG. 5, in accordance with one or more embodiments described herein.
Figure 10:
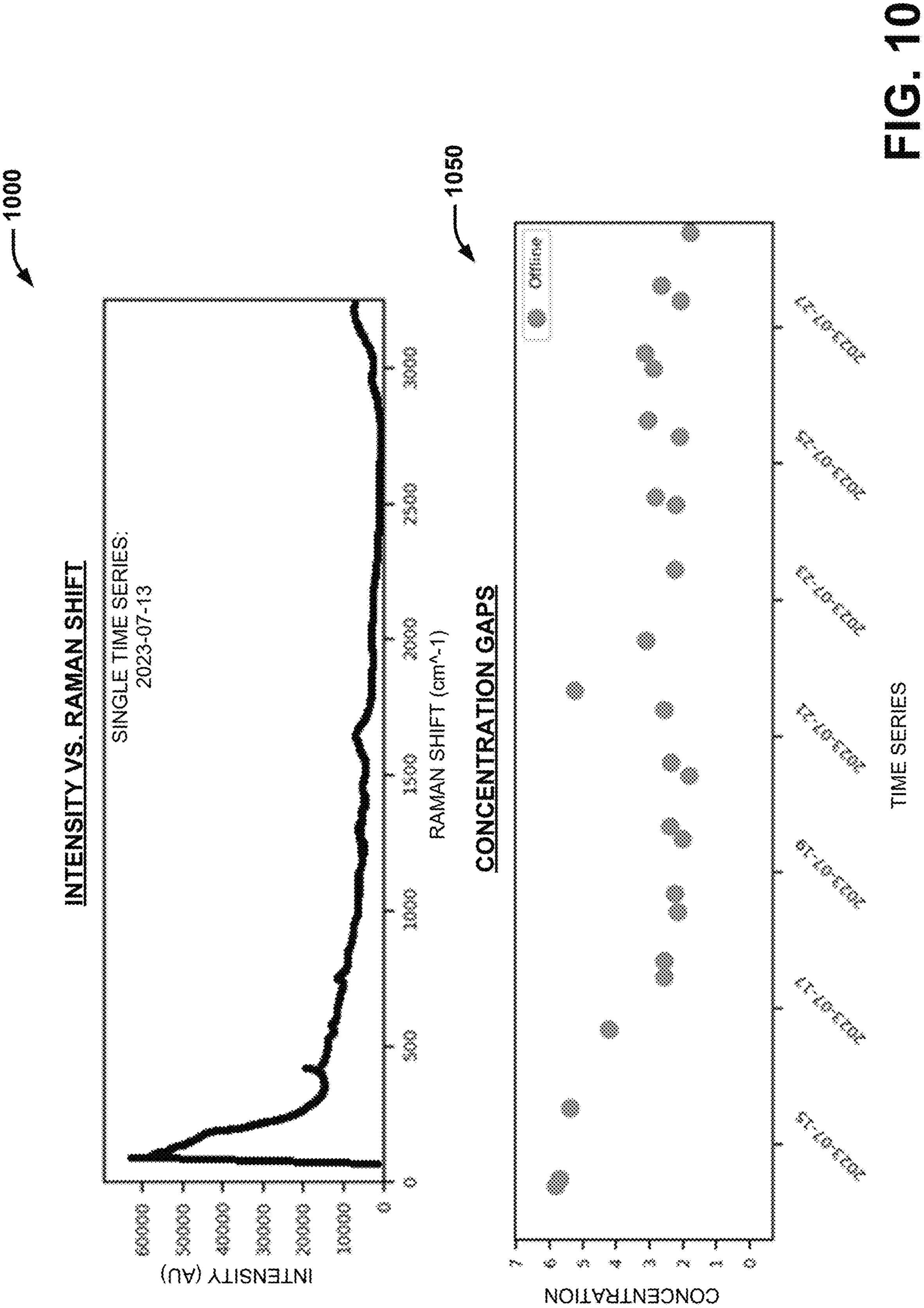
FIG. 10 illustrates a pair of graphs depicting results that can be obtained using the non-limiting systems of FIGS. 11 and 12 based on raw data output from the analyzer of FIG. 5, in accordance with one or more embodiments described herein.
Figure 11:
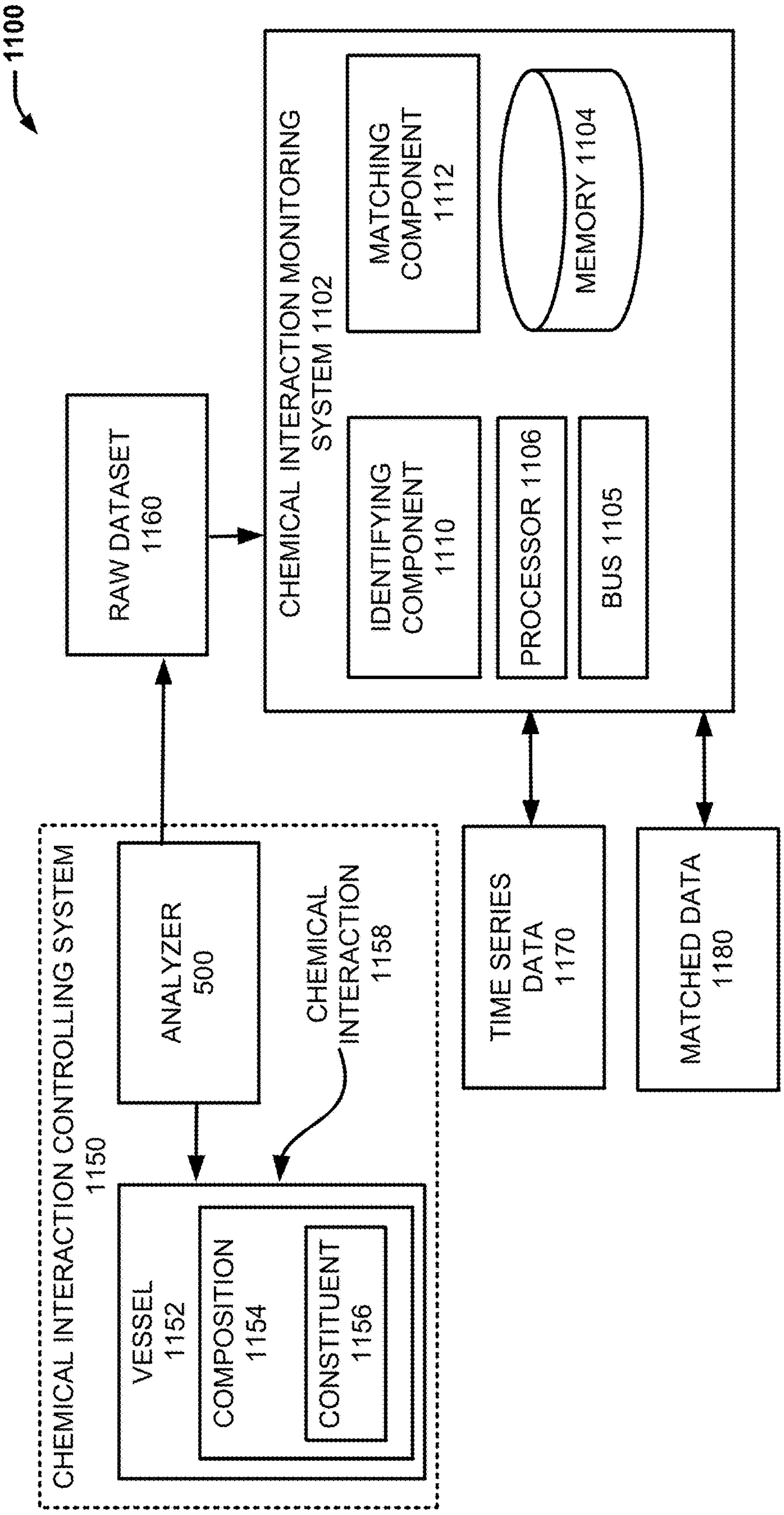
FIG. 11 illustrates a block diagram of an example, non-limiting system that can facilitate a process for chemical interaction monitoring, in accordance with one or more embodiments described herein.
Figure 12:
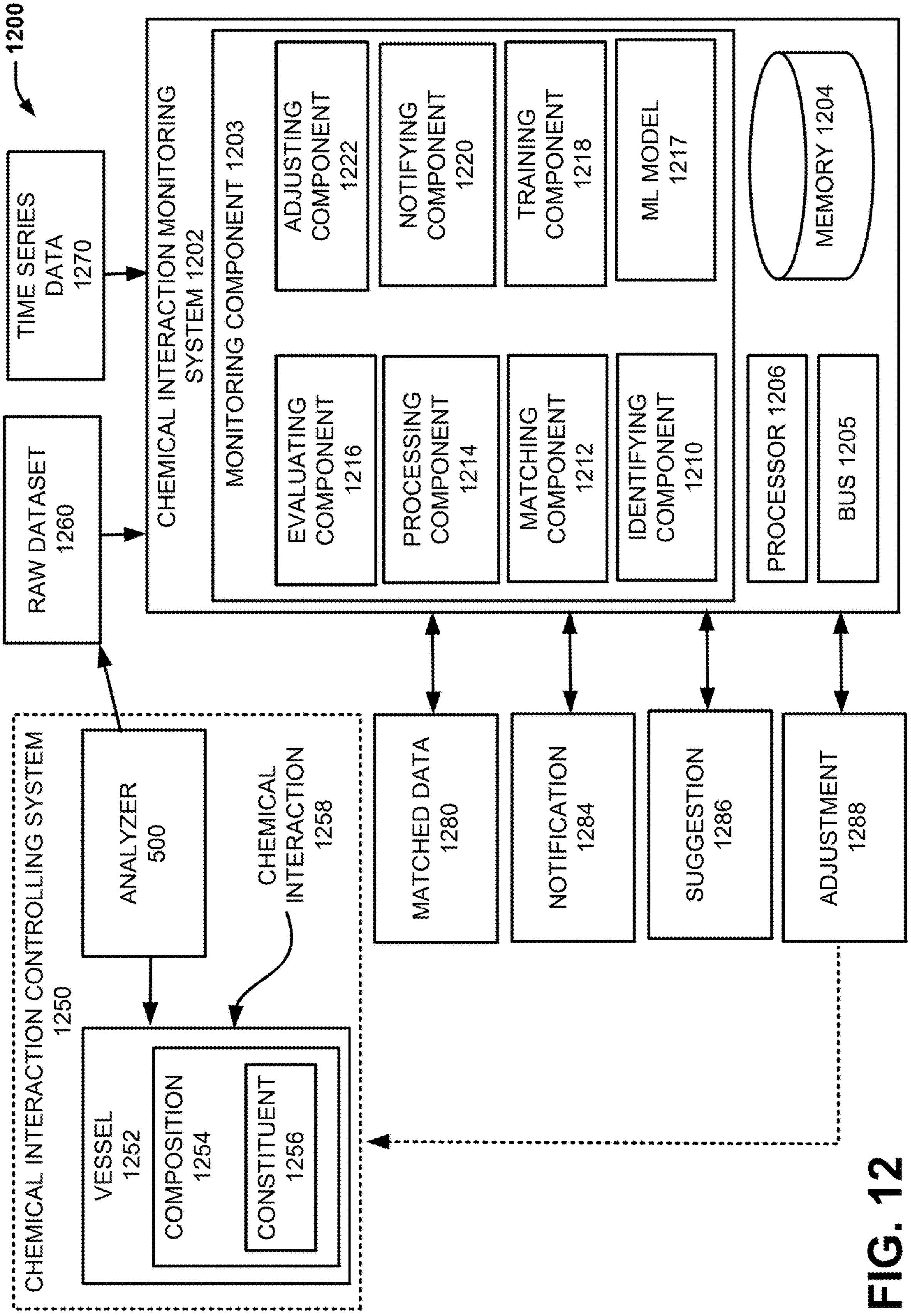
FIG. 12 illustrates a block diagram of another example, non-limiting system that can facilitate a process for chemical interaction monitoring, in accordance with one or more embodiments described herein.

Referring next to FIGS. 5 to 10, a set of illustrations are provided to describe one or more exemplary devices, systems, methods and/or computer program products that can be employed in connection with the non-limiting system 1100 and 1200 of FIGS. 11 and 12 to facilitate one or more processes for chemical interaction monitoring.

Figure 5:
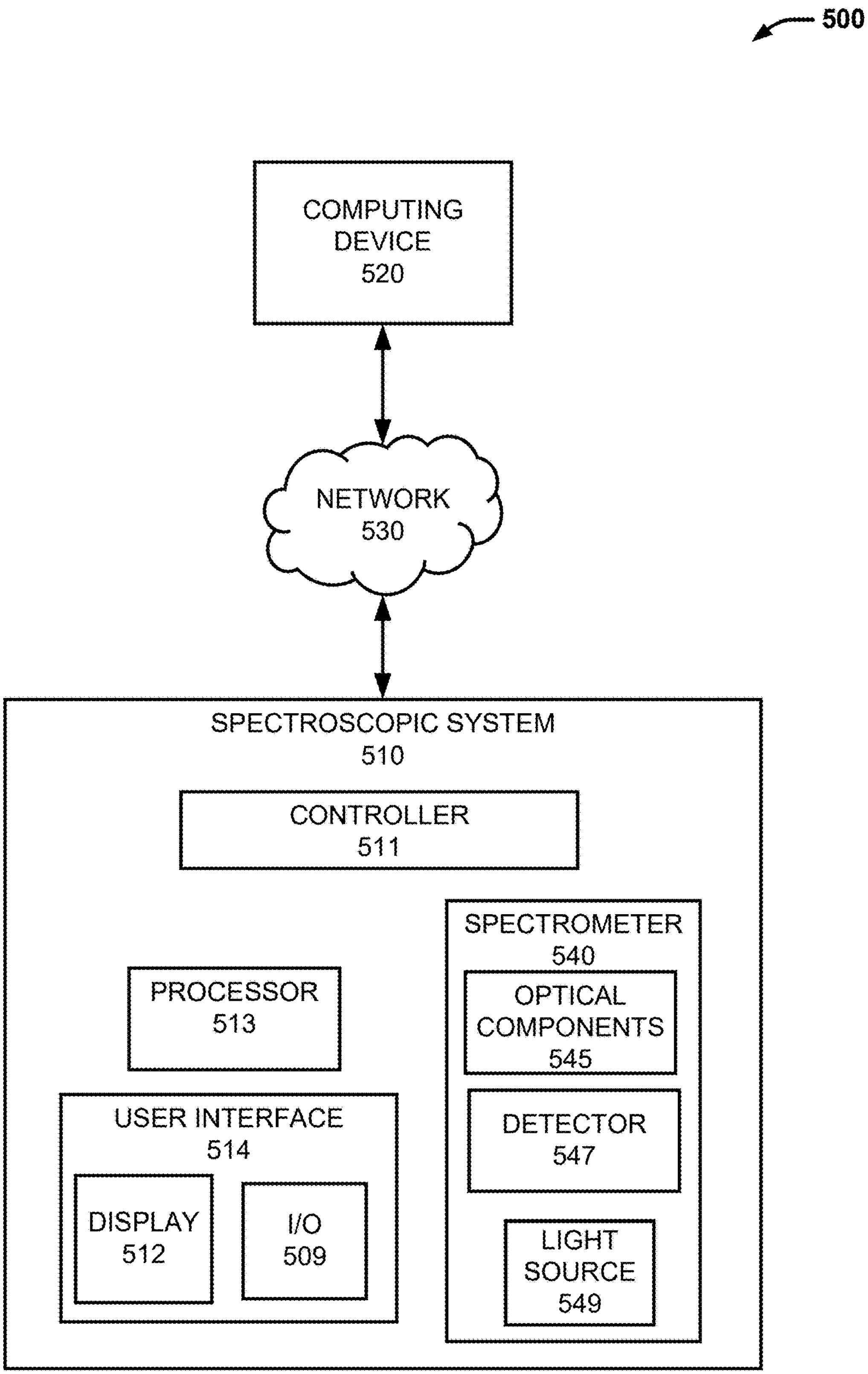
FIG. 5 illustrates provides an exemplary schematic of an analyzer that can function in correspondence with a chemical interaction monitoring system of FIG. 11, in accordance with one or more embodiments described herein.

In particular, illustrated is an analyzer 500 of FIG. 5 and a set of schematic depictions (FIGS. 6 to 9) illustrating various examples of implementations of one or more exemplary optical architectures of the analyzer 500 of FIG. 5. In connection therewith, FIG. 10 illustrates a set of graphs depicting exemplary data that can be sought based on raw data output from the analyzer 500 of FIG. 5.

Those of ordinary skill in the art can appreciate that there are a variety of different optical architectures and arrangements utilized in the field of Raman spectroscopy. FIG. 5 provides an illustrative example of the analyzer 500 which can comprise an optical architecture and other elements that operate to measure one or more Raman spectra from a sample via one or more of the methods described herein.

FIG. 5 illustrates an implementation of the analyzer 500 that can comprise a device gathering system 510, such as a spectroscopic system 510, communicatively connected to computing device 520 via network 530. It will be appreciated that, in one or more implementations, at least a portion of the computing device 520 can be located separate from spectroscopic system 510, providing the opportunity for increased computing power at a central location and/or across multiple locations. One skilled in the art can envision various interconnections, both physical and wireless, between the components of the system. It will further be appreciated that, in one or more implementations, spectroscopic system 510 and computing device 520 can be communicatively connected physically without network 530. Alternatively, one or more implementations of analyzer 500 and/or spectroscopic system 510 can, instead, not require the resources of computing device 520. Instead, the one or more implementations can utilize the resources of controller 511 and/or processor 513. Thus, computing device 520 can, differently, not be necessary for operation of analyzer 500 and/or spectroscopic system 510 and the example of FIG. 5 should not be considered as limiting.

It should be understood that, in one or more implementations, one or more components of analyzer 500 and/or of spectroscopic system 510 can be included in a common housing forming an analytical instrument that can include a benchtop and/or a portable Raman spectrometer device (e.g. a handheld device). However, in one or more other implementations, one or more components of the analyzer 500 and/or of the spectroscopic system 510 can be contained in separate housings and/or devices and/or can be coupled (e.g., optically, communicatively, electrically, mechanically and/or the like) as needed to carry out the one or more methods described herein.

Also, in one or more implementations, the operations described herein as being performed by the components of analyzer 500 and/or of spectroscopic system 510 can be combined and/or distributed in various ways. For example, in one or more implementations, processor 513 can be part of controller 511, wherein controller 511 is configured to perform the operations of processor 513 as described herein. Furthermore, the operations described herein as being performed by controller 511 can be distributed among multiple controllers. In one or more embodiments, the operations described herein as being performed by controller 511 can be distributed among one or more computing devices (e.g., processor 513 and/or computing device 520).

Analyzer 500 and/or spectroscopic system 510 can also comprise additional components (such as power components), user interface 514 (such as display 512 and/or user input device 509 such as a keyboard, a mouse and/or a touch screen), optical components 515 (e.g., mirrors, lenses, fiber optic cables, gratings and/or filters). Spectroscopic system 510 can also comprise spectrometer 540 that can comprise optical components 545, detector 547 (e.g., a CCD detector, a PMT detector, or other detector known in the art), and light source 549 to provide an excitation beam (e.g., an LED, excitation laser, or other source providing light with a wavelength range that can include 785 nm or 1064 nm wavelengths of light, among other suitable wavelengths).

In one or more implementations, analyzer 500 and/or spectroscopic system 510 can comprise a fully integrated portable system operated by a user on battery power to take Raman spectroscopy measurements in a variety of environments that can comprise a laboratory setting, a manufacturing (e.g. bioreactor based) setting, a remote setting, etc. Also, in one or more same or alternative implementations, one or more elements of spectroscopic system 510 can be utilized as separated systems communicatively connected (e.g., optically, wirelessly, electrically, mechanical, and the like) operated on battery power and/or power outlets connected to a central power source to take Raman spectroscopy measurements in a variety of environments.

Referring now to light source 549 of spectrometer 540, it will be appreciated that implementations of light source 549 can emit wavelengths of light as needed for an application. For example, such wavelengths can comprise and/or be between a range of about 400 nm to about 1064 nm, a range of about 400 nm to about 750 nm, a range of about 400 nm to about 600 nm, a range of about 400 nm to about 500 nm, a range of about 600 nm to about 900 nm, a range of about 700 nm to about 850 nm, a range of 600 nm to 1064 nm, a range of 750 nm to 1064 nm, a range of 850 nm to 1064 nm, and/or a range of 950 nm to 1064 nm, as well as a wavelength of about 785 nm, or a wavelength of about 1064 nm.

Figure 6:
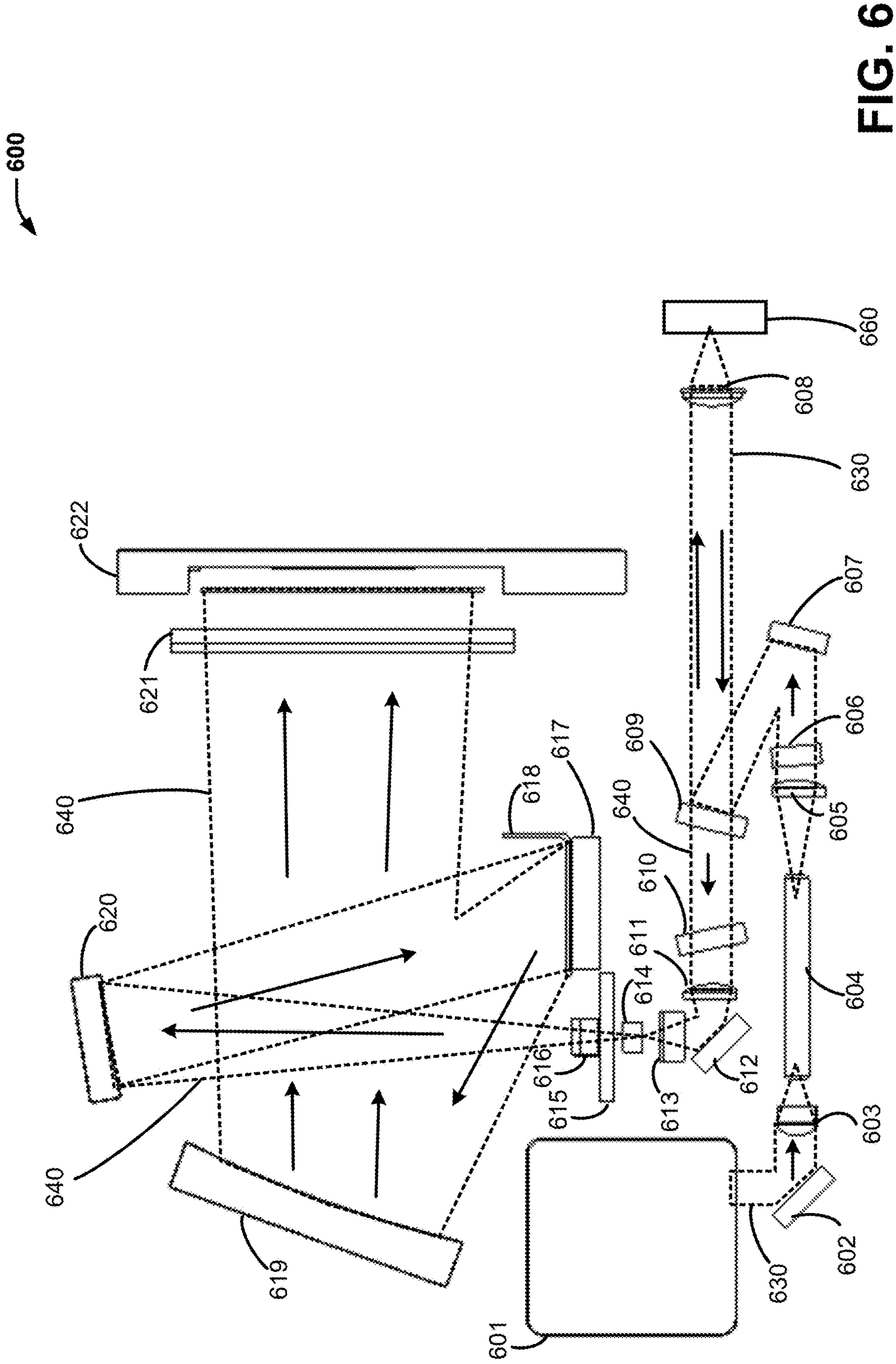
FIG. 6 provides an exemplary depiction of one implementation of an optical architecture of the analyzer of FIG. 5, in accordance with one or more embodiments described herein.

Turning now to FIG. 6, provided is an illustrative example of one implementation of an optical architecture comprising optical components of spectrometer 540 (see FIG. 5), that otherwise can be collectively referred to as an optical system 600. It will be appreciated that different optical architectures of Raman spectrometer are known in the art and thus the example of FIG. 6 should not be considered as limiting. For example, one or more implementations can employ what are referred to as transmission gratings rather the reflection gratings, as well as associated differences in optical architecture.

The example of FIG. 6 illustrates one implementation of light source 549 (see FIG. 5) as laser assembly 601 comprising a laser source that produces a beam of light that travels along optical path 630 (e.g. arrows illustrate direction of travel of the light beam) to sample 660. It will be appreciated that sample 660 can include any type of sample of interest to a user which can include substantially dry samples (e.g. a powder, solid material), substantially fluid samples (e.g. a liquid, gas), or a combination thereof (e.g. a gel). In response to the light from laser assembly 601, sample 660 can produce scattered light (e.g. comprising a Raman portion and a Rayleigh portion of scattered light).

In one or more implementations, the laser assembly 601 can produce laser power as needed for an application. For example, such laser power can comprise and/or be between a range of about 250 mW to about 750 mW; a range of about 250 mW to about 700 mW; a range of about 250 mW to about 650 mW; a range of about 250 mW to about 600 mW; a range of about 250 mW to about 550 mW; a range of about 250 mW to about 500 mW; a range of about 250 mW to about 450 mW; a range of about 250 mW to about 400 mW; a range of about 250 mW to about 350 mW; a range of about 250 mW to about 300 mW; and/or about 250 mW. Also in one or more implementations, the laser power can affect one or more values of a base value and/or of bright-max intensity values when sample 660 is scanned. It will be appreciated that other ranges and/or levels of laser power are known in the art and thus the example described for laser assembly 601 should not be considered as limiting.

FIG. 6 also illustrates one implementation of an architecture that can directionally control beam path 630 and beam path 640 as well as conditioning one or more characteristics of the beam of light produced from laser assembly 601 as well as from sample 660. For example, turning mirror 602 can redirect beam path 630 to focusing lens 603 that focuses the beam onto waveguide phase scrambler 604 (e.g. to adjust the phase characteristics of the beam). The beam exits waveguide phase scrambler 604 and travels to collimating lens 605 (e.g. adjusts collimation characteristics of the beam), then to broadband filter 606 transmissive to a specific wavelength or range of wavelengths of light. The beam travels to flat mirror 607 that redirects beam path 630 to selective element 609. It will be appreciated that selective element 609 can include a dichroic mirror, notch filter, and/or other element that comprises substantially reflective characteristics to the wavelength(s) of the beam from laser assembly 601 and comprises substantially transmissive characteristics to a wavelength or wavelength range associated with Raman scattered light from sample 660. In the described example, selective element 609 redirects beam path 630 to lens 608 that focuses the beam to sample 660. In the described example, lens 608 can include any type of lens known in the art such as an objective lens that focuses the beam on to sample 660. Also, one or more implementations of lens 608 can comprise one or more special configurations and/or characteristics that can provide one or more advantages for one or more different types of sample 660.

Lens 608 collects Raman scattered light and/or Rayleigh scattered light produced from sample 660 in response to the beam from laser assembly 601, produces beam path 640 that travels back to selective element 609. As described above, selective elements 609 and 610 that are substantially transmissive to the wavelengths of the Raman scattered light, allowing beam path 640 to pass through to additional optical elements that further adjusts the path and conditions the characteristics of the beam traveling along beam path 640. For example, the optical elements can include focusing lens 611, flat mirror 616, baffle 613, slit 614, baffle 615, and/or collimating lens 605.

Beam path 640 travels from collimating lens 605 to mirror 620 which reflects beam path 640 towards diffraction grating 617. In one or more implementations, the diffraction grating 617 comprises a reflective diffraction grating that produces a spectral distribution of light. Beam path 640 then travels to focusing mirror 619 that redirects beam path 640 to focusing lens 621 that directs the beam to elements of detector 622. It will also be appreciated that FIG. 6 illustrates baffle 618 which in one or more implementations control stray light.

Figure 7:
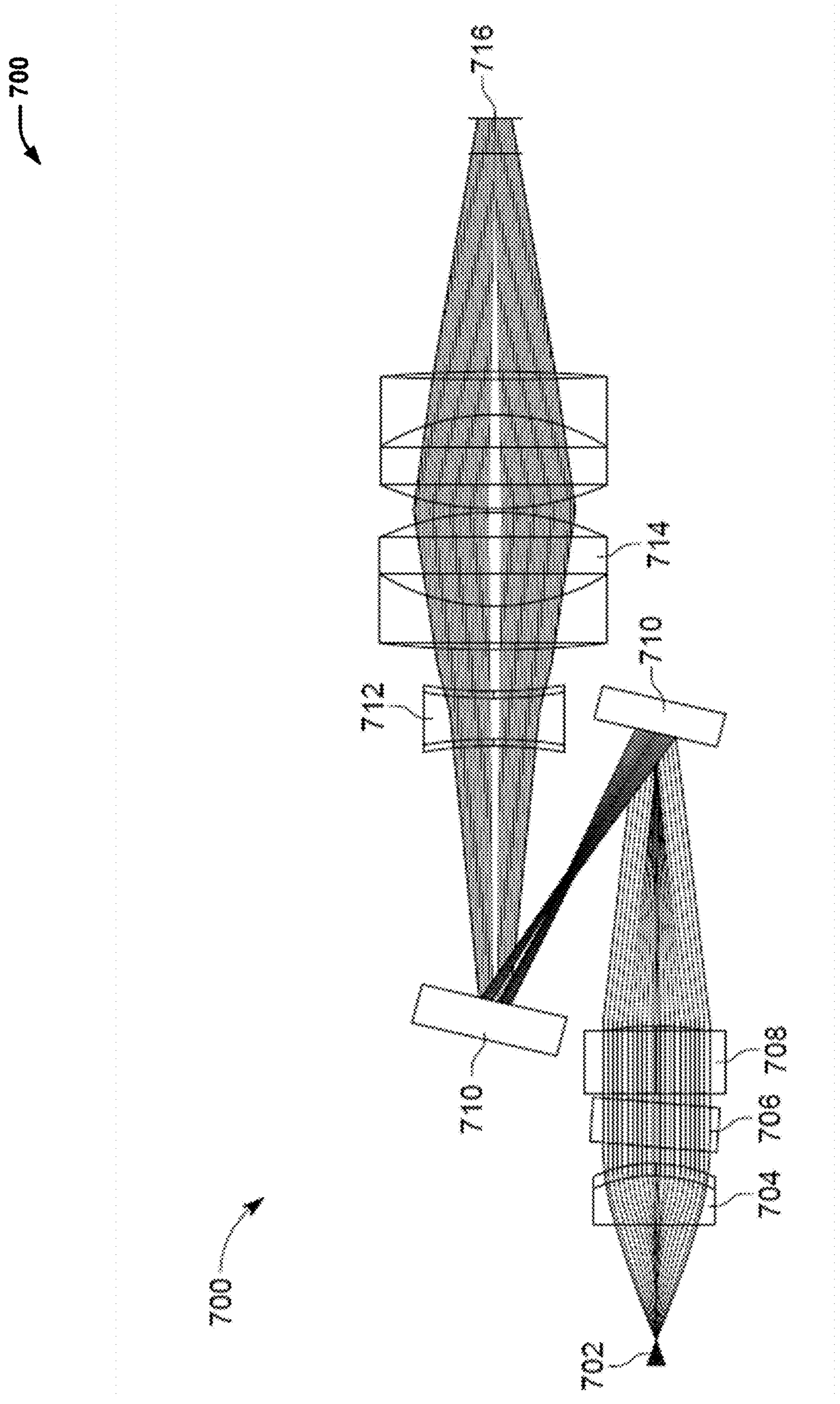
FIG. 7 provides an exemplary depiction of another implementation of an optical architecture of the analyzer of FIG. 5, in accordance with one or more embodiments described herein.

As described above, it will be appreciated that a variety of implementations of lens 608 can be available that can provide different focusing and light collection characteristics. FIG. 7, provides an illustrative example of an implementation with optical architecture advantageous for analyzing a sample contained in a package (e.g. a bag, bottle, etc.), where the optical architecture comprises some components of optical system 600 (see FIG. 6) and other components that provide the characteristics of lens 608 (see FIG. 6), collectively referred to as an optical arrangement 700. In the described example, optical arrangement 700 includes element 702 that can include focusing lens 603 (see FIG. 6) or an output from an optical fiber. Element 702 directs the beam (e.g. produced from light source 549 or laser assembly 601; see, e.g., FIGS. 5 and 6) to collimating lens 704 that produces a substantially collimated beam. In the described example, collimating lens 704 can be movably mounted such that it can change position along the axis of the optical path. The range of motion includes a range of about 0.1 mm to about 10 mm to allow for a change in spot size on the sample surface to range from about 10 microns to about 10 mm. It will also be appreciated that any of collimating lens 704, concave focusing lens 712 and/or focusing optics 714 either alone or in combination can be movably mounted to effect a change in spot size.

Collimating lens 704 directs the substantially collimated beam into an aspheric diffuse ring producing optic 708 configured to produce a light pattern that is radially diffuse.

The intensity of the output from the aspheric diffuse ring producing optic 708 is more intense at the outer edge of the resulting pattern than in the center. While this pattern could be projected directly onto a sample 716, in practical application it can be advantageous to use one or more steering mirrors 710, one or more filters 706, and/or one or more focusing elements, such as a concave focusing lens 712 and/or focusing optics 714, to direct the radially diffuse light pattern onto the sample surface 716.

Figure 8:
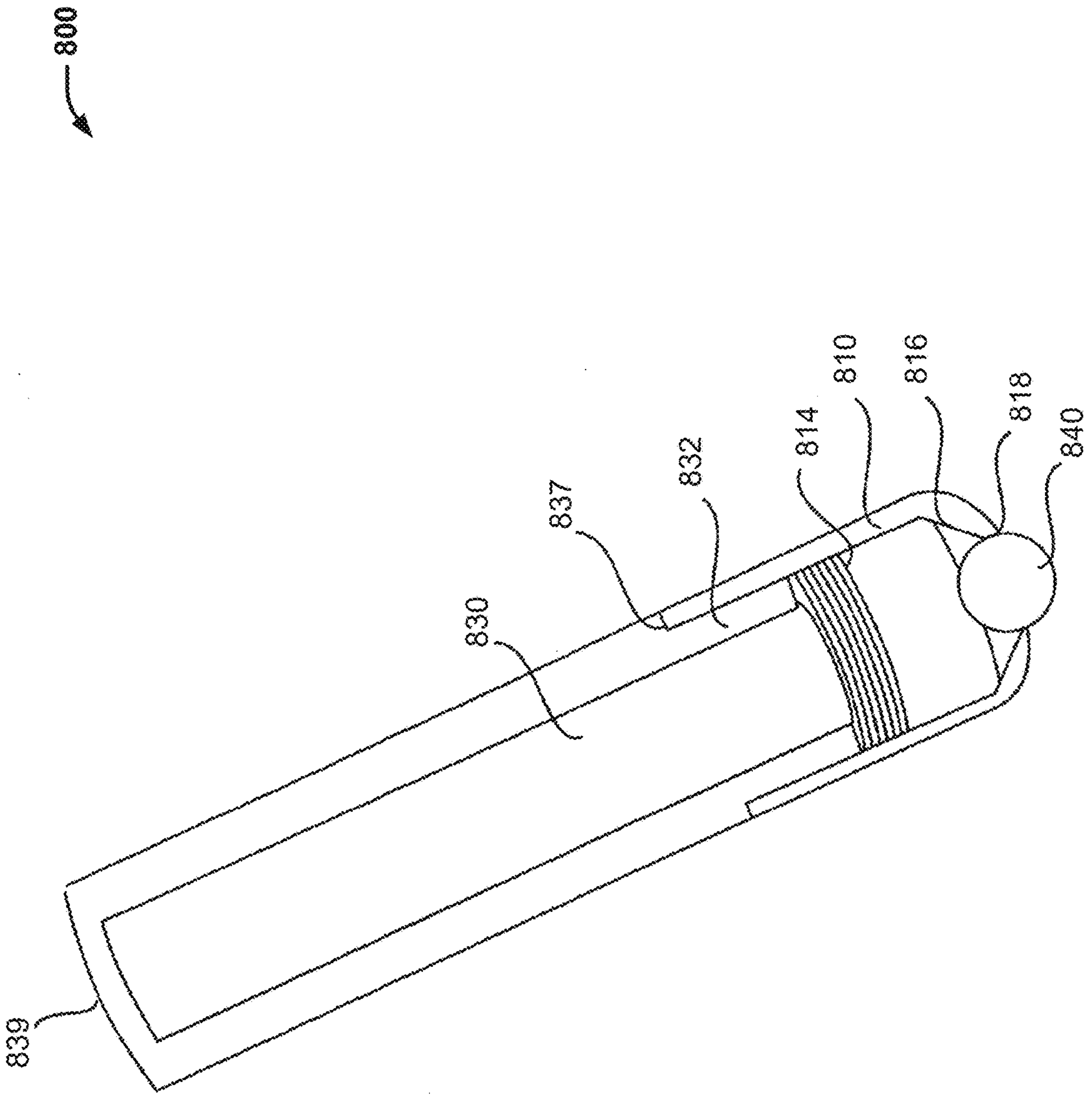
FIG. 8 provides an exemplary depiction of still another implementation of an optical architecture of the analyzer of FIG. 5, in accordance with one or more embodiments described herein.

FIG. 8, provides an illustrative example of another implementation of lens 608 (see FIG. 6) advantageous for analyzing a fluid or semi-fluid sample that comprises some components of optical system 600 and other components that provide the characteristics of what is generally referred to as an "immersion probe" and collectively referred to as an optical arrangement 800. The implementation illustrated in FIG. 8. comprises spherical lens 840 seated within cylindrical probe tip 810 at lens opening 818 of channel 816. A seal between probe tip 810 and lens 840 is formed at the opening by any means known in the art, including all forms of welding or braising and the use of epoxies or other adhesives. Probe tip 810 can be any length. Optionally, probe tip 810 can have threads 814 on its interior surface and can be extended using probe tube 830, which has threaded collar 832 for threading into probe tip 810. A seal is optionally formed between probe tube lip 837 and the distal end of probe tip 810. Further, in the described example, optical arrangement 800 can comprise a fiber optic coupling 839 that transmits illumination light from laser assembly 601 (see FIG. 6) as well as scattered light from sample 660 that can include a liquid sample where lens 840 is immersed in the liquid. Also in the described example, optical arrangement 800 can be configured as a separated element from spectroscopic system 510 (see FIG. 5) where an optical fiber provides optical communication between spectroscopic system 510 and optical arrangement 800.

It will be appreciated that the examples provided in FIG. 7 and FIG. 8 are for the purposes of illustration and one or more implementations can include additional or fewer elements as needed for an application. For instance, in one or more implementations, one or more windows, collimating lenses and/or other optical elements can be employed in one or more applications that utilize a fiber optic coupling or other need for conditioning a beam or protecting internal environments. Therefore, the examples provided in FIG. 7 and FIG. 8 should not be considered as limiting.

FIG. 9 provides another illustrative example of an implementation of an optical architecture comprising optical components of spectrometer 540 (see FIG. 5), that are otherwise collectively referred to as optical system 900. It will be appreciated that different optical architectures of Raman spectrometer are known in the art and thus the example of FIG. 9, similar to the examples of FIGS. 5 to 8, should not be considered as limiting.

The example of FIG. 9 illustrates one implementation of light source 549 (see FIG. 5) as a Raman laser 519 comprising a laser source that produces a beam of light that travels along optical path 910 (e.g. arrows illustrate direction of travel of the light beam) to sample 930. Like sample 608 (see FIG. 6), it will be appreciated that sample 930 can include any type of sample of interest to a user which can include substantially dry samples (e.g. a powder, solid material), substantially fluid samples (e.g. a liquid, gas), or some combination thereof (e.g. a gel). In response to the light from Raman laser 519 sample 930 produces scattered light (e.g. comprising a Raman portion and a Rayleigh portion of scattered light).

In one or more implementations, the Raman laser assembly 519 can produce laser power as needed for an application for example, the laser power including or being between a range of about 250 mW to about 1050 mW, including various subranges therebetween such as the non-limiting subranges described above for light source 549 and laser assembly 601. It will also be appreciated that in one or more implementations, the laser power can affect the values of the base value and the bright-max intensity values when sample 590 is scanned.

FIG. 9 illustrates an architecture that in some implementations directionally controls beam path 911 and/or beam path 920. In one or more implementations, beam paths 911, 920 can be controlled using one or more of turning mirrors, waveguide phase scramblers, various lenses, broadband filters and/or selective elements (e.g., mirrors, notch filters and/or other elements with substantially reflective characteristics to the wavelength(s) of the beam from Raman laser 519 and/or substantially transmissive characteristics to a wavelength or wavelength range associated with Raman scattered light from sample 930). In the described example, selective element 911 is transmissive to the to the laser wavelengths emitted from Raman laser 519 allowing the beam path 910 to be directed to lens 908 which focuses the beam to sample 930. In the described example, lens 908 can include any type of lens known in the art such as an objective lens or lens architecture such as arrangement 700 or 800 (see FIG. 7 and FIG. 8) that focuses the beam on to sample 930.

One or more implementations of lens 908 can comprise one or more special configurations and characteristics that provide advantages for different types of samples. For example, lens 908 can collect Raman scattered light and Rayleigh scattered light produced from sample 930 in response to the beam from Raman laser 519. The scattered light collected by lens 908 is directed back from the surface of the sample 930 and travels back along path 910 to the selective element 911 (e.g., a beam splitter 911 such as dichroic mirror) which directs the scattered light along beam path 920. In one or more implementations, selective element 911 is substantially reflective to the wavelengths of the Raman scattered light, allowing beam path 920 to be directed to one or more additional optical elements that further adjust the path and condition the characteristics of the beam traveling along beam path 920. Other optical arrangements also are contemplated for selective element 911 for directing the scattered light along beam path 920.

The optical elements can include one or more of optical components 515*a*-515*c*, which can include one or more of collimating lens and mirrors, filters such as a notch filter, diffraction gratings and/or mirror relays. The scattered light is then directed by one or more of optical components 515*a*-515*c* onto a detector 517. Signal processing and/or digitizing of signals associated with the scattered light that is received by the detector 517 can then be handled by an electrical signal processor 513 associated with optical system 900. In one or more implementations, the electrical signal processor 513 can be a suitably programmed microprocessor and/or application specific integrated circuit including a read-only or read-write memory of any known type which holds instructions and/or data for spectrometer operation as described herein.

As described above, it will be appreciated that a variety of implementations of lens 908 can be available that can provide different focusing and/or light collection characteristics.

Turning next to FIG. 10, illustrated is a set of graphs depicting exemplary data that can be sought based on raw data output from the analyzer 500 of FIG. 5. For example, graph 1000 illustrates intensity vs. Raman shift. Graph 1050 illustrates varying gaps in concentration data. As mentioned above, due to the ability of the one or more embodiments described herein to automatically perform time series matching of generated data, these concentration gaps can be observed rather than overlooked, e.g., occurring between data generations in existing frameworks using low frequency data gathering due to inability to manually time series match data generated at a speed similar to a speed at which the data is generated.

Figure 20:
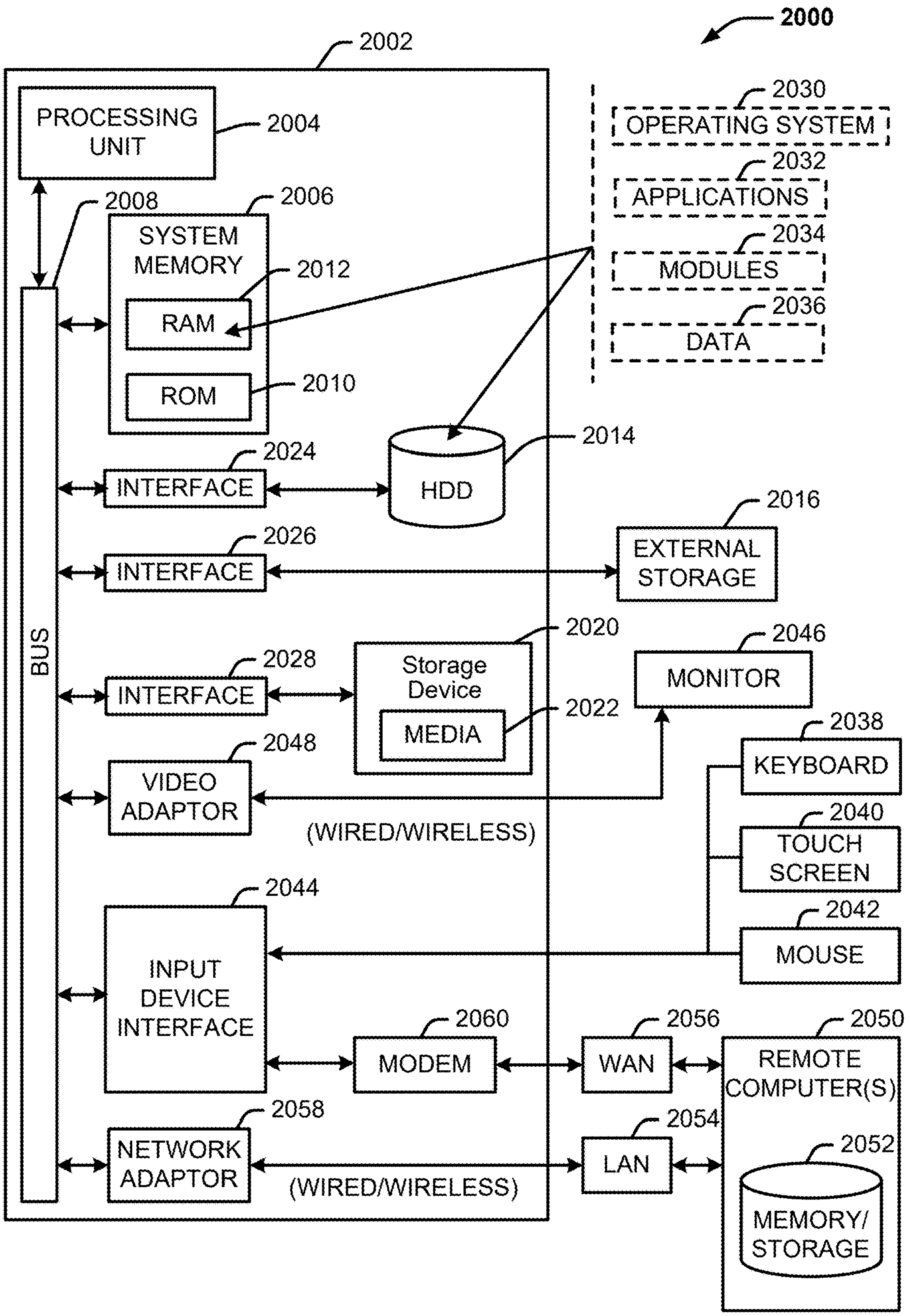
FIG. 20 illustrates an example schematic block diagram of a computing environment with which the subject matter described herein can interact and/or be implemented at least in part.

Referring next to FIGS. 11 and 12, in one or more embodiments, the non-limiting systems 1100 and/or 1200 illustrated at FIGS. 11 and 12, and/or systems thereof, can further comprise one or more computer and/or computing-based elements described herein with reference to a computing environment, such as the computing environment 2000 illustrated at FIG. 20. In one or more described embodiments, computer and/or computing-based elements can be used in connection with implementing one or more of the systems, devices, components and/or computer-implemented operations shown and/or described in connection with FIGS. 11 and/or 12 and/or with other figures described herein.

Turning first to FIG. 11, the figure illustrates a block diagram of an example, non-limiting system 1100 that can comprise a chemical interaction monitoring system 1102 and a chemical interaction controlling system (CICS) 1150. The chemical interaction monitoring system 1102 can facilitate a process for monitoring of a chemical interaction 1158 comprising a composition 1154 comprising at least one constituent 1156 that is occurring or has at least partially occurred in a vessel 1152 of the CICS 1140. This process can be at least partially based on an output from an analyzer 500 of the CICS 1150. That is, the chemical interaction monitoring system 1102 can be employed in connection with the analyzer 500, as described above relative to at least FIG. 5.

In one or more embodiments, the chemical interaction monitoring system 1102 can be at least partially comprised by the computing device 400.

In one or more embodiments, the chemical interaction monitoring system 1102 can at least partially comprise the analyzer 500 and/or vice versa.

It is noted that the chemical interaction monitoring system 1102 is only briefly detailed to provide but a lead-in to a more complex and/or more expansive chemical interaction monitoring system 1202 as illustrated at FIG. 12. That is, further detail regarding processes that can be performed by one or more embodiments described herein will be provided below relative to the non-limiting system 1200 of FIG. 12.

Still referring to FIG. 11, the chemical interaction monitoring system 1102 can comprise at least a memory 1104, bus 1105, processor 1106, identifying component 1110, and matching component 1112. The processor 1106 can be the same as the processor 402, comprised by the processor 402 or different therefrom. The memory 1104 can be the same as the storage device 404, comprised by the storage device 404 or different therefrom.

Using the above-noted components, the chemical interaction monitoring system 1102 can facilitate a process to monitor the chemical interaction taking place or having at least partially taken place in the vessel 1152 (e.g., a bioreactor).

Generally, the identifying component 1110 can identify a raw dataset 1160 of spectral vector data corresponding to the chemical interaction 1158. In one or more embodiments, the identifying component 1110 can identify time series data 1170 defining (e.g., bounding, describing) at least a time range over which the chemical interaction 1158 corresponding to the spectral vector data occurred and was observed.

Based on the raw dataset 1160 and time series data 1170 identified by the identifying component 1110, the matching component 1112 can generate a set of matches (e.g., matched data 1180) between the time series data 1170 and chemical interaction data comprised by the spectral vector data of the raw dataset 1160.

As a result of these components, automatic correlation of the datasets 1260 and 1270 can be rapidly facilitated for large quantities of data, such as about 500 to about 10,000 spectral vectors generated over a short time range, such as about ten minutes, as will described below in greater detail relative to FIG. 12.

The identifying component 1110 and matching component 1112 can be operatively coupled to the processor 1106 which can be operatively coupled to the memory 1104. The bus 1105 can provide for the operative coupling. The processor 1106 can facilitate execution of the identifying component 1110 and matching component 1112. The identifying component 1110 and matching component 1112 can be stored at the memory 1104.

In general, the non-limiting system 1100 can employ any suitable method of communication (e.g., electronic, communicative, internet, infrared, fiber, etc.) to provide communication between the chemical interaction monitoring system 1102, the analyzer 500 and/or any device associated with a user entity.

Turning next to FIG. 12, a non-limiting system 1200 is illustrated that can comprise a chemical interaction monitoring system 1202 and analyzer 500. Repetitive description of like elements and/or processes employed in respective embodiments is omitted for sake of brevity. Description relative to an embodiment of FIG. 10 can be applicable to an embodiment of FIG. 12. Likewise, description relative to an embodiment of FIG. 12 can be applicable to an embodiment of FIG. 11.

Generally, the chemical interaction monitoring system 1202 can facilitate a process for monitoring of a chemical interaction 1258 comprising a composition 1254 comprising at least one constituent 1256 that is occurring or has at least partially occurred in a vessel 1252 of the chemical interaction controlling system (CICS) 1250. This process can be at least partially based on an output from an analyzer 500 of the CICS 1250. That is, the chemical interaction monitoring system 1202 can be employed in connection with the analyzer 500, as described above relative to at least FIG. 5.

The non-limiting system 1200 can comprise the chemical interaction monitoring system 1202 and the chemical interaction controlling system (CICS) 1250.

In one or more embodiments, the chemical interaction monitoring system 1202 can be at least partially comprised by the computing device 400.

In one or more embodiments, the chemical interaction monitoring system 1202 can at least partially comprise the analyzer 500.

One or more communications between one or more components of the non-limiting system 1200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

Figure 19:
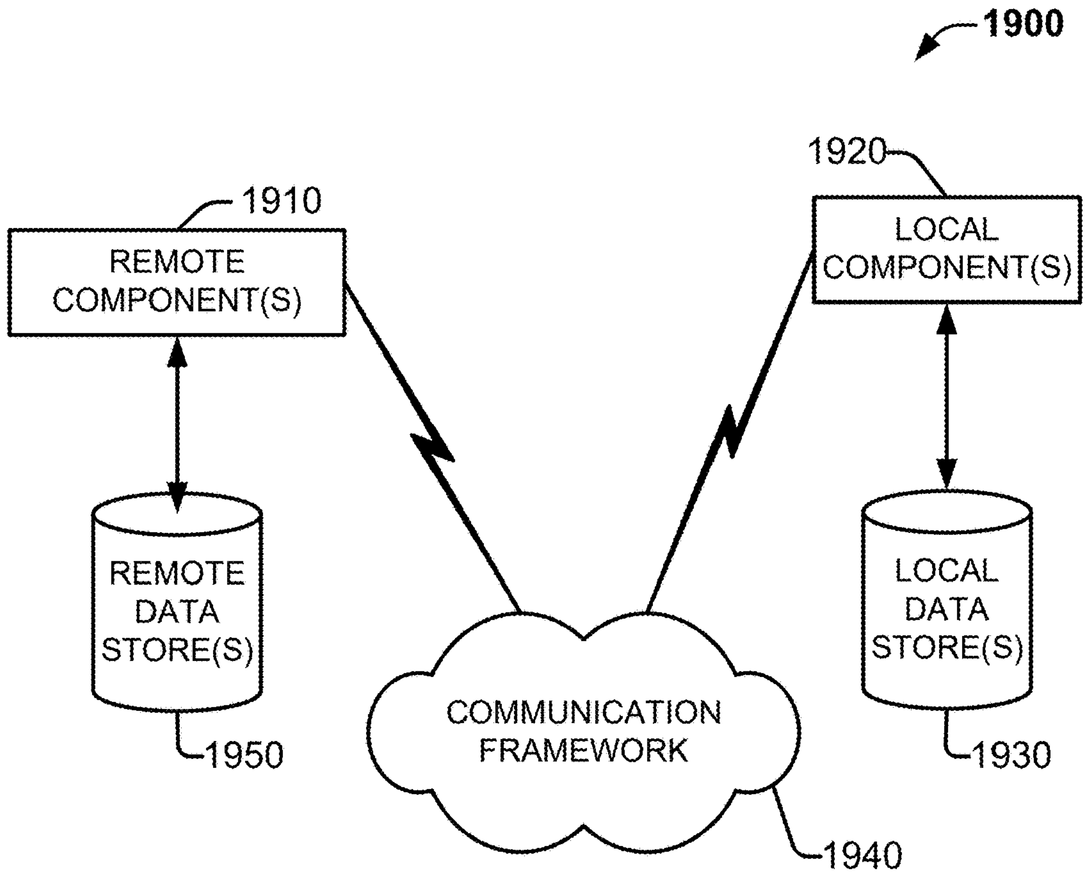
FIG. 19 illustrates a block diagram of an example operating environment into which embodiments of the subject matter described herein can be incorporated.

The chemical interaction monitoring system 1202 can be associated with, such as accessible via, a cloud computing environment, such as the cloud computing environment 1900 of FIG. 19.

The chemical interaction monitoring system 1202 can comprise a plurality of components. The components can comprise a memory 1204, processor 1206, bus 1205, identifying component 1210, matching component 1212, processing component 1214, evaluating component 1216, ML model 1217, training component 1218, notifying component 1220 and/or adjusting component 1222. Using these components, the chemical interaction monitoring system 1202 can monitor and even adjust the chemical interaction 1258.

Discussion next turns to the processor 1206, memory 1204 and bus 1205 of the chemical interaction monitoring system 1202. For example, in one or more embodiments, the chemical interaction monitoring system 1202 can comprise the processor 1206 (e.g., computer processing unit, microprocessor, classical processor, quantum processor and/or like processor). In one or more embodiments, a component associated with chemical interaction monitoring system 1202, as described herein with or without reference to the one or more figures of the one or more embodiments, can comprise one or more computer and/or machine readable, writable and/or executable components and/or instructions that can be executed by processor 1206 to provide performance of one or more processes defined by such component and/or instruction. In one or more embodiments, the processor 1206 can comprise the identifying component 1210, matching component 1212, processing component 1214, evaluating component 1216, ML model 1217, training component 1218, notifying component 1220 and/or adjusting component 1222.

In one or more embodiments, the chemical interaction monitoring system 1202 can comprise the computer-readable memory 1204 that can be operably connected to the processor 1206. The memory 1204 can store computer-executable instructions that, upon execution by the processor 1206, can cause the processor 1206 and/or one or more other components of the chemical interaction monitoring system 1202 (e.g., identifying component 1210, matching component 1212, processing component 1214, evaluating component 1216, ML model 1217, training component 1218, notifying component 1220 and/or adjusting component 1222) to perform one or more actions. In one or more embodiments, the memory 1204 can store computer-executable components (e.g., identifying component 1210, matching component 1212, processing component 1214, evaluating component 1216, ML model 1217, training component 1218, notifying component 1220 and/or adjusting component 1222).

The chemical interaction monitoring system 1202 and/or a component thereof as described herein, can be communicatively, electrically, operatively, optically and/or otherwise coupled to one another via a bus 1205. Bus 1205 can comprise one or more of a memory bus, memory controller, peripheral bus, external bus, local bus, quantum bus and/or another type of bus that can employ one or more bus architectures. One or more of these examples of bus 1205 can be employed.

In one or more embodiments, the chemical interaction monitoring system 1202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the chemical interaction monitoring system 1202 and/or of the non-limiting system 1200 can reside in the cloud, and/or can reside locally in a local computing environment (e.g., at a specified location).

In addition to the processor 1206 and/or memory 1204 described above, the chemical interaction monitoring system 1202 can comprise one or more computer and/or machine readable, writable and/or executable components and/or instructions that, when executed by processor 1206, can provide performance of one or more operations defined by such component and/or instruction.

Discussion next turns to the additional components of the chemical interaction monitoring system 1202 (e.g., identifying component 1210, matching component 1212, processing component 1214, evaluating component 1216, ML model 1217, training component 1218, notifying component 1220 and/or adjusting component 1222).

First, it is noted that in one or more embodiments, the identifying component 1210, matching component 1212, processing component 1214, evaluating component 1216, ML model 1217, training component 1218, notifying component 1220 and/or adjusting component 1222 can be implemented independently, without one or more other of the identifying component 1210, matching component 1212, processing component 1214, evaluating component 1216, ML model 1217, training component 1218, notifying component 1220 and/or adjusting component 1222. Additionally and/or alternatively, the identifying component 1210, matching component 1212, processing component 1214, evaluating component 1216, ML model 1217, training component 1218, notifying component 1220 and/or adjusting component 1222 can be comprised by a high-level monitoring component 1203, one or more of the below-described functions of the identifying component 1210, matching component 1212, processing component 1214, evaluating component 1216, ML model 1217, training component 1218, notifying component 1220 and/or adjusting component 1222 can be performed by the high-level monitoring component 1203, and/or the identifying component 1210, matching component 1212, processing component 1214, evaluating component 1216, ML model 1217, training component 1218, notifying component 1220 and/or adjusting component 1222 can be omitted with the high-level monitoring component 1203 performing one or more of the below-described functions of the one or more omitted identifying component 1210, matching component 1212, processing component 1214, evaluating component 1216, ML model 1217, training component 1218, notifying component 1220 and/or adjusting component 1222.

Turning now first to the identifying component 1210, this component can identify a raw dataset 1260 of data, such as spectral vector data, corresponding to the chemical interaction 1258. It is appreciated that the raw dataset 1260 can be generated by the analyzer 500 and stored at any suitable location accessible to the chemical interaction monitoring system 1202. In one or more embodiments, the spectral vector data can correspond to Raman spectroscopy readings obtained using an excitation beam of the analyzer 500. In such case, the spectral vector data can be employed to identify one or more concentrations of one or more constituents 1256 of the composition 1254 undergoing the chemical interaction 1258.

In one or more embodiments, the identifying component 1210 can identify time series data 1270 defining (e.g., bounding, describing) at least a time range over which the chemical interaction 1258 corresponding to the spectral vector data occurred and was observed. The time series data 1270 can be stored at any suitable location accessible to the chemical interaction monitoring system 1202. The time series data can comprise a range of time values corresponding to a range of time over which the raw dataset 1260 was generated and/or over which the raw data set 1260 corresponds (e.g., the raw dataset 1260 represents data values having occurred at various time of the range of time).

In one or more embodiments, the time series data 1270 can comprise one or more indicators of time zone, daylight savings time and/or other time-related descriptors and/or modifiers.

Based on the raw dataset 1260 and time series data 1270 identified by the identifying component 1210, the matching component 1212 can generate a set of matches (e.g., matched data 1280) between the time series data 1270 and chemical interaction data comprised by the spectral vector data of the raw dataset 1260. This generating can comprise generating and/or identifying a data file (e.g., a comma-separated values file), adding one or more data organizers (e.g., a time stamp column and/or data value column), and/or employing one or more aspects of metadata of the raw dataset 1260 to match an aspect of the raw dataset 1260 to an aspect of the time series data 1270. Once matched, indicators for each aspect can be written to the data file. This process can be repeated for all aspects of the raw dataset 1260.

In one or more embodiments, the matching component 1212 can employ interpolation based on one or more aspects of the raw dataset 1260 being consecutively generated to determine matching time series data 1270, such as where metadata of the one or more aspects being missing, unreadable and/or lacking time-based metadata. In such case, time series data 1270 for the one or more aspects of the raw dataset 1260 can be determined based on time series data 1270 for one or more adjacent aspects of the raw dataset 1260 having sufficient metadata.

In one or more embodiments, the matching component 1212 generates the matched data 1280 based on a specified time zone setting comprising a change in time due to daylight savings time.

In one or more embodiments, the matching component 1212 generates the matched data 1280 based on a spectroscopy setting, wherein the spectroscopy setting corresponds to a spectroscopy device having been employed to generate the raw dataset of spectral vector data. For example, the spectroscopy setting can be employed to define, correlate, convert and/or normalize the spectral vector data of the raw dataset 1260. It is noted that this process can be applicable also to non-spectroscopy-related data.

To further process the matched data 1280, the processing component 1214 can normalize the matched data averaging together two or more aspects of data, such as spectral vectors, from the raw dataset 1260/matched data 1280, which are consecutively ordered by time over a subrange of the range of time. This can allow for achieving a higher signal to noise ratio that is not comprised natively by the raw dataset 1260/matched data 1280.

In one or more embodiments, the matched data 1280 can comprise a gap, such as due to lack of raw data of the raw dataset 1260. This can be due to loss of the data, failure of the data gathering device to activate, corruption of the data, removal of the data and/or the like. The processing component 1214 can characterize a suggested reasoning for a gap in the matched data 1280 based on other information available to the processing component 1214, such as provided by a machine learning model 1217, to be described below.

In one or more embodiments, the processing component 1214 can remove a non-conforming aspect of the matched data 1280, such as an aspect of spectral vector data, of the matched data 1280, corresponding to a spectral vector baseline caused by fluorescence of a constituent involved in the chemical interaction, or corresponding to a cosmic radiation emission, wherein the processing component 1214 removes the non-conforming aspect from the raw dataset. In one or more embodiments, a time threshold can be set between a reference timestamp and the closest matched spectra timestamp. If the threshold is exceeded, the data gathering instrument was not running during the reference collection and that data point can be discarded.

Additionally, and/or alternatively, removal can be based on the aspect of data satisfying a corresponding removal threshold, such as specific to a level of constituent concentration. Additionally, and/or alternatively, removal can be based on the aspect of data failing to satisfy a value based on an adjacent data value (e.g., consecutively before and/or consecutively after).

Next, the evaluating component 1216 can evaluate a trend at the set of matches, and the notifying component 1220 can generate a notification 1284 corresponding to progress of a constituent involved in the chemical interaction as compared to a progress threshold. This evaluating can comprise any suitable analysis of the time series matched data 1280, such as employing a machine learning model 1217.

It is noted that the ability to process the matched data and/or to evaluate a trend of the matched data can be based on the volume and frequency of the matched data relative to the respective time range corresponding to the matched data. Indeed, based on ability to time series match the data gathered, as quickly as new data is generated, one or more new actionable insights (e.g., previously unavailable using existing frameworks) can be obtained for the non-limiting system 1200 and/or for an administrating user entity. Such new insights can be provided to the user entity using the notifying component 1220, to be described below. For example, based on additional data yields having been made possible, rates of chemical interactions can be observed, such as rates that cells consume glucose, interpolation between varying data-based measurements and/or the like. For example, in one or ore embodiments, about ten thousand or more spectra can be processed per minute of processing time.

In one or more embodiments, the machine learning model 1217 can be communicatively coupled to a predictive model to allow for obtaining of predictive results relative to the chemical interaction 128.

Additionally, and/or alternatively, to the notification 1284, the adjusting component 1222 can output a suggestion 1286 of a change to a parameter of an interaction device (e.g., the CICS 1250) controlling progress of a constituent of the chemical interaction, or direct a change (e.g., an adjustment 1288) of the parameter (or other parameter) of the interaction device (e.g., the CICS 1250).

As noted above, one or more of the processes/operations performed by the chemical interaction monitoring system 1202 can be scalable. For example, the identifying component 1210 can further identify a second raw dataset of spectral vector data corresponding to the chemical interaction, and the matching component 1212 can generate a second set of matches between an extension of the time series data, corresponding to a second range of time subsequent to the range of time, and second chemical interaction data comprised by the spectral vector data of the second raw dataset. Further, the evaluating component 1216 can correlate the first set of matches to the second set of matches. In this way, the evaluation component can further evaluate one or more trends and/or changes occurring over a longer time range, than a first time range corresponding to the first set of matches or a second time range corresponding to the second set of matches, using the corresponding matched data 1280 have processing already performed (e.g., by the processing component 1214 to normalize the matched data 1280 and/or to remove nonconformities in the matched data 1280).

In one or more embodiments, the evaluating component 1216 can further generate display data comprising a concentration spectrum defining a concentration of a constituent 1256 of the chemical interaction 1258 over a subrange of the range of time, such as is illustrated at graph 1000 of FIG. 10.

Figure 13:
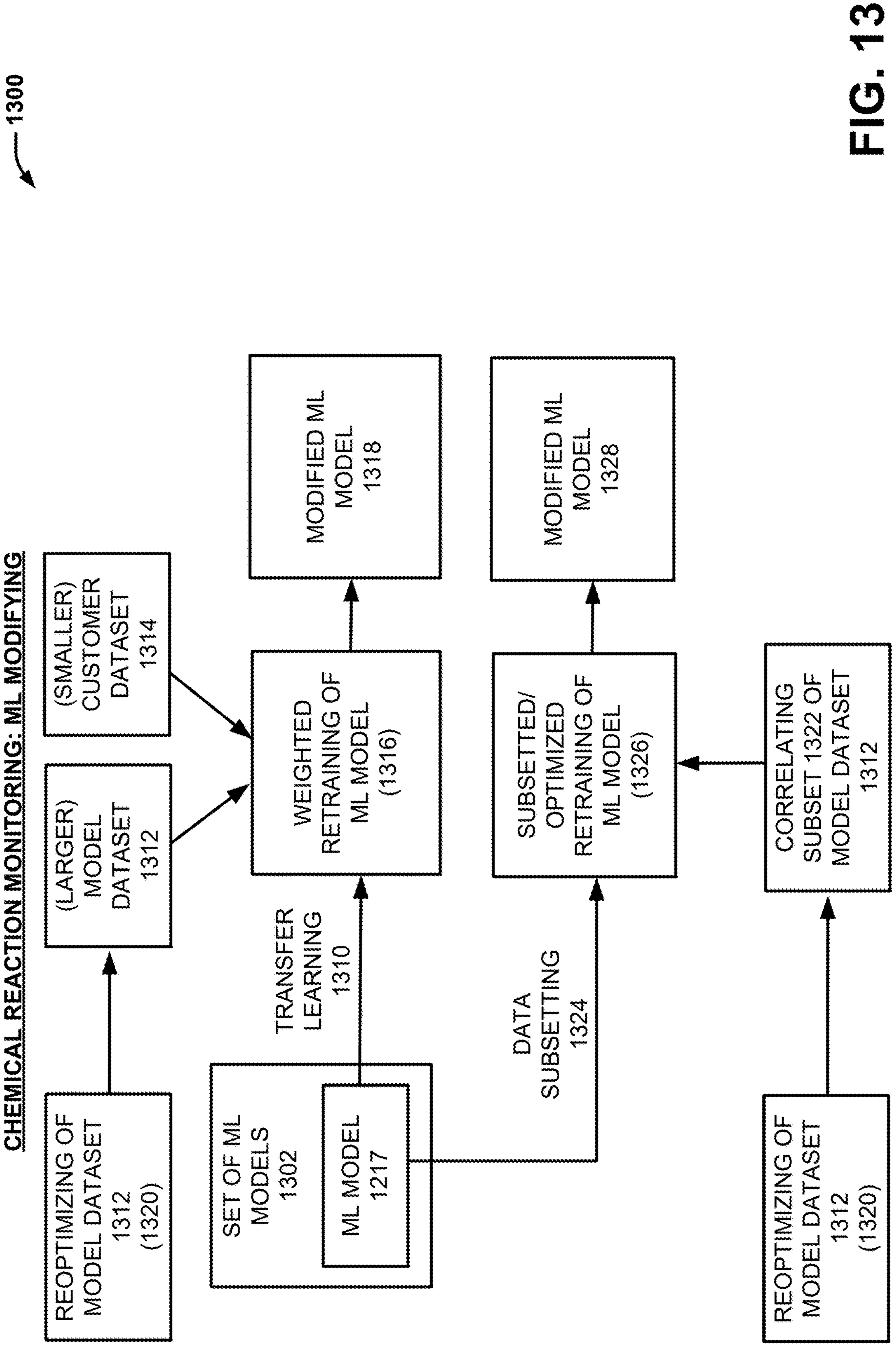
FIG. 13 provides a schematic block diagram depicting a process flow, corresponding to machine learning model employment, which can be performed by and/or facilitated by the chemical interaction monitoring system of FIG. 12, in accordance with one or more embodiments described herein.

Turning now to FIG. 13, in one or more cases, the one or more embodiments described herein can provide artificial intelligence (AI) optimization for processing (e.g., including evaluating) the matched data 1280 resulting from the matching. For example, the processing component 1214 and/or the evaluating component 1216 can employ one or more machine learning (ML) models 1217 comprised by and/or communicatively accessible to the chemical interaction monitoring system 1202. For example, the processing component 1214 and/or the evaluating component 1216 can identify a machine learning model 1217 from a set 1302 (FIG. 13) of machine learning models 1217 accessible to the system, wherein use of the machine learning model 1217 reduces overfit of the raw dataset as compared to use of a second machine learning model 1217 of the set of machine learning models 1217.

In one or more embodiments, the specified machine learning model 1217 can identify a data subset of the matched data 1280, wherein the data subset corresponds to a set of specified measurement factors, such as allowing for provision of an actionable insight, as described above.

In one or more embodiments, the ML model 1217 can employ a neural network, AI, deep neural network and/or the like.

The AI optimization can be streamlined, such as by a training component 1218, relative to a specified chemical interaction through various processes including, but not limited to subsetting of base data underlying the AI optimization and/or transfer training of a machine learning (ML) model, or another model, being employed to facilitate the AI optimization. These processes can allow for self-improvement and self-learning of the ML model 1217 and/or of the chemical interaction monitoring system 1202. These processes can both be performed for a same ML model 1217, in one or more cases.

For example, referring to FIG. 13, data subsetting 1324 can comprise using a lesser quantity of the data underlying the AI optimization, where the lesser quantity has a greater relation to the specified chemical interaction 1258 (such as to a specified composition and/or constituent 1256 of the chemical interaction 1258) than data filtered out from the base data (e.g., raw dataset 1260 and/or time series data 1270).

For example, in one or more embodiments, the training component 1218 can customize the machine learning model 1217 by performing a reoptimizing 1320 of the model data set 1312 (also herein referred to as a model dataset 1312), upon which the machine learning model 1217 operates. In one or more cases, this can comprise correlating a constituent-specific dataset 1322, corresponding to a constituent 1256 of the chemical interaction 1258, to the model dataset 1312. This correlating can comprise filtering the base dataset 1312 to remove data of the base dataset 1312 having a specified similarity level relative to the constituent-specific dataset 1322, where the similarity level does not satisfy a similarity level threshold. That as, data of the base dataset 1312 that does satisfy the similarity level threshold can be retained. Based on the subsetting/optimizing 1326, the training component 1218 can re-train the machine learning model 1217, resulting in a modified ML model 1328.

Referring still to FIG. 13, transfer learning 1310 can comprise combining the base dataset 1312 underlying the AI optimization with a smaller set 1314 of specified data having a higher relation to the specified chemical interaction (such as to a specified composition 1254 and/or constituent 1256 of the chemical interaction 1258) than the base dataset 1312 underlying the AI optimization. Further, this smaller set of specified data can have associated therewith higher weights than the base data, which weighting can be employed to retrain the ML model 1217.

For example, in one or more embodiments, the training component 1218 can customize the machine learning model 1217 by performing a reoptimizing 1320 of the base dataset 1312. The reoptimizing 1320 can comprise aggregating the base dataset 1312 with a constituent-specific dataset 1314 (also herein referred to as a customer dataset 1314), such as corresponding to a constituent 1256 of the chemical interaction 1258. In one or more cases, the constituent-specific dataset 1314 can be smaller than the base dataset 1312. In one or more cases, additionally, and/or alternatively, the constituent-specific dataset 1314 can be weighted higher than the base dataset for the weighted retraining 1316 performed for the machine learning model 1217 by the training component 1218. This weighted retraining 1316 can therefore result in a modified ML model 1318.

Figure 14:
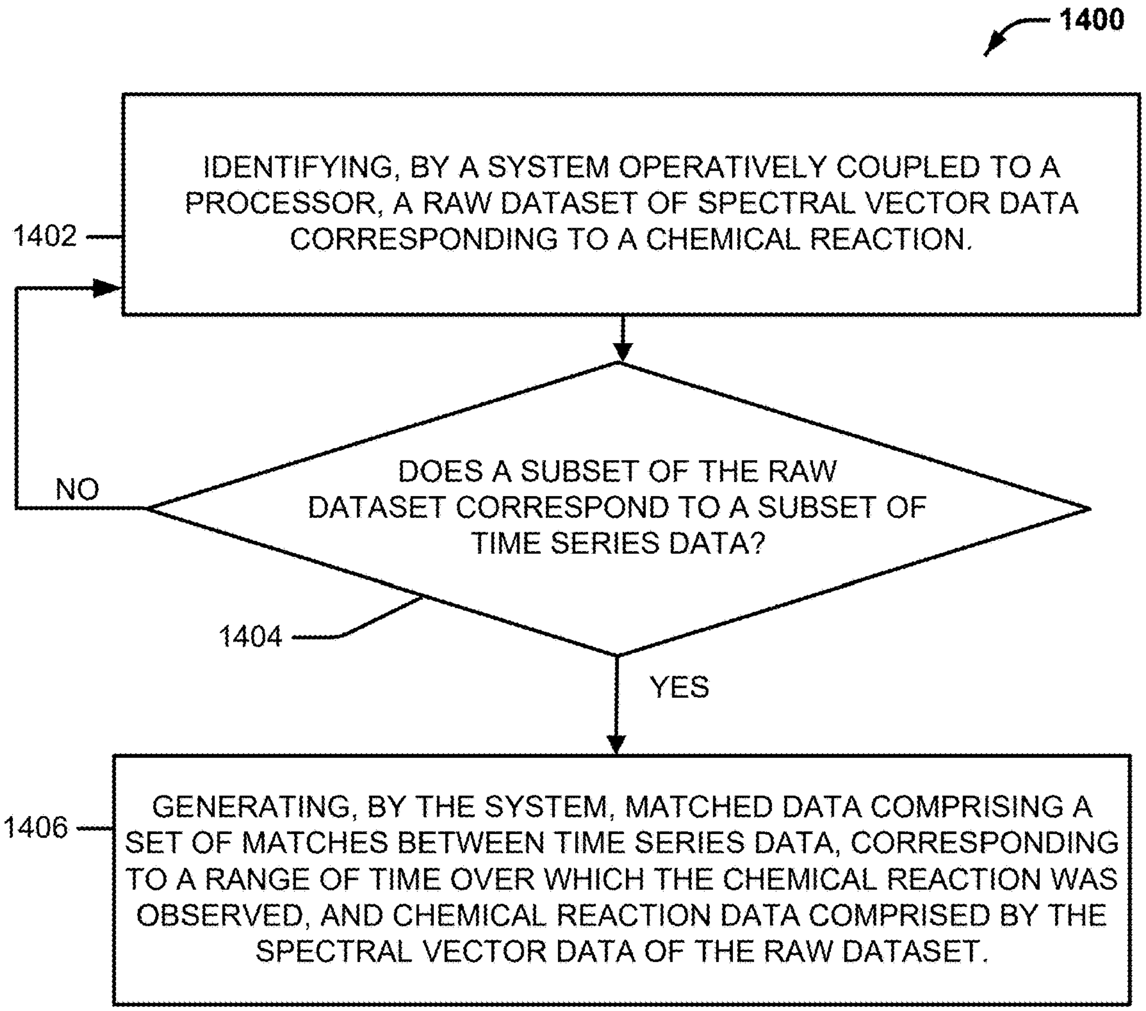
FIG. 14 illustrates a flow diagram of one or more processes that can be performed by the chemical interaction monitoring system of FIG. 12, in accordance with one or more embodiments described herein.

As a summary of the above-described components and/or functions thereof, referring next to FIG. 14, illustrated is a flow diagram of an example, non-limiting method 1400 that can facilitate a process for chemical interaction monitoring, in accordance with one or more embodiments described herein, such as the non-limiting system 1200 of FIG. 1. While the non-limiting method 1400 is described relative to the non-limiting system 1200 of FIG. 12, the non-limiting method 1400 can be applicable also to other systems described herein, such as the non-limiting system 1100 of FIG. 11. Repetitive description of like elements and/or processes employed in respective embodiments is omitted for sake of brevity.

At 1402, the non-limiting method 1400 can comprise identifying, by a system operatively coupled to a processor, a raw dataset of spectral vector data corresponding to a chemical interaction.

At 1404, the non-limiting method 1400 can comprise determining, by the system, if a subset of the raw dataset corresponds to a subset of time series data. If no, the non-limiting method 1400 can proceed back to step 1402 for re-executing the identifying action. If yes, the non-limiting method 1400 can proceed forward to step 1406.

At 1406, the non-limiting method 1400 can comprise generating, by the system, matched data comprising a set of matches between time series data, corresponding to a range of time over which the chemical interaction was observed, and chemical interaction data comprised by the spectral vector data of the raw dataset.

Figure 15:
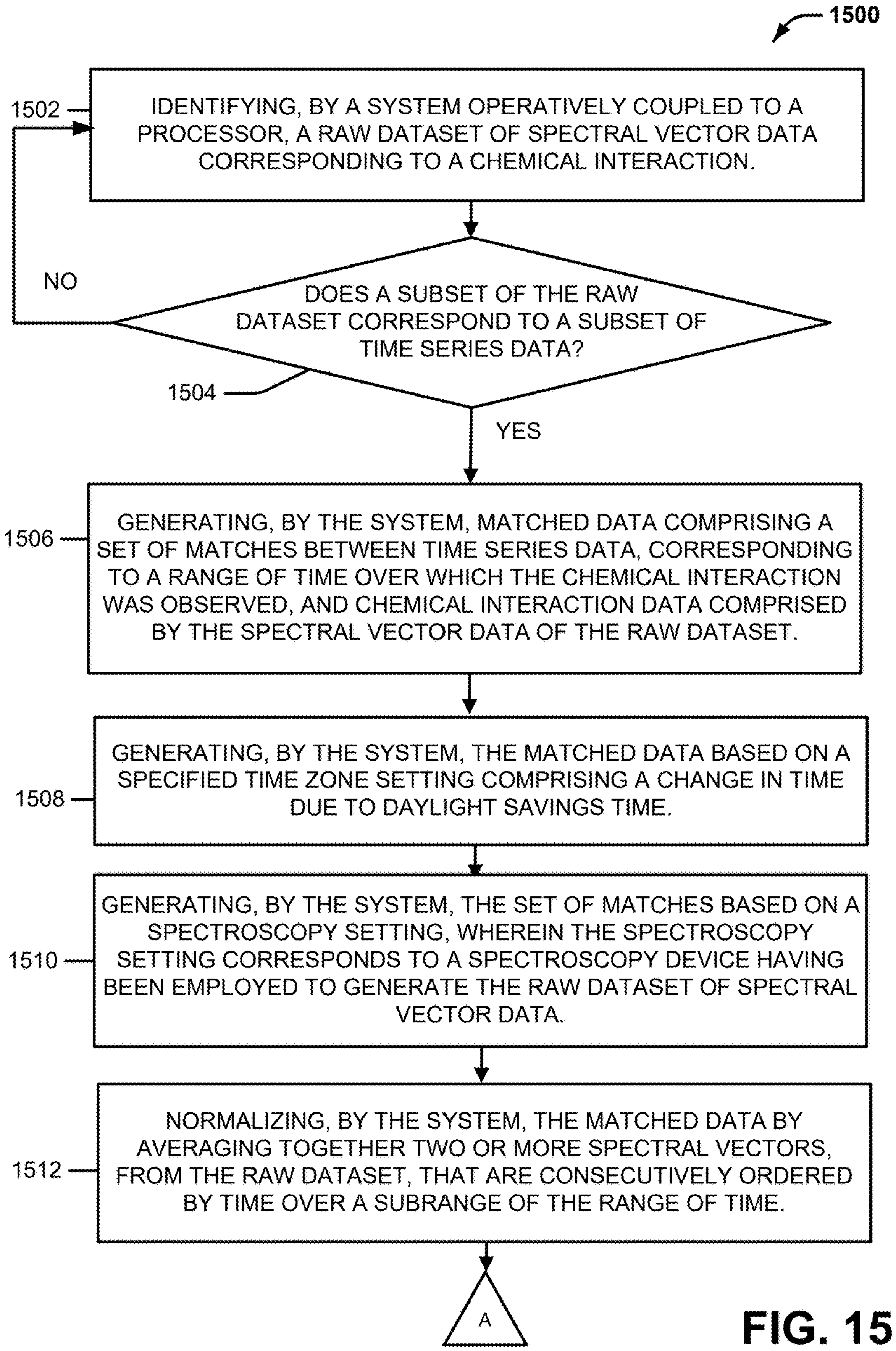
FIG. 15 illustrates another flow diagram of one or more processes that can be performed by the chemical interaction monitoring system of FIG. 12, in accordance with one or more embodiments described herein.
Figure 16:
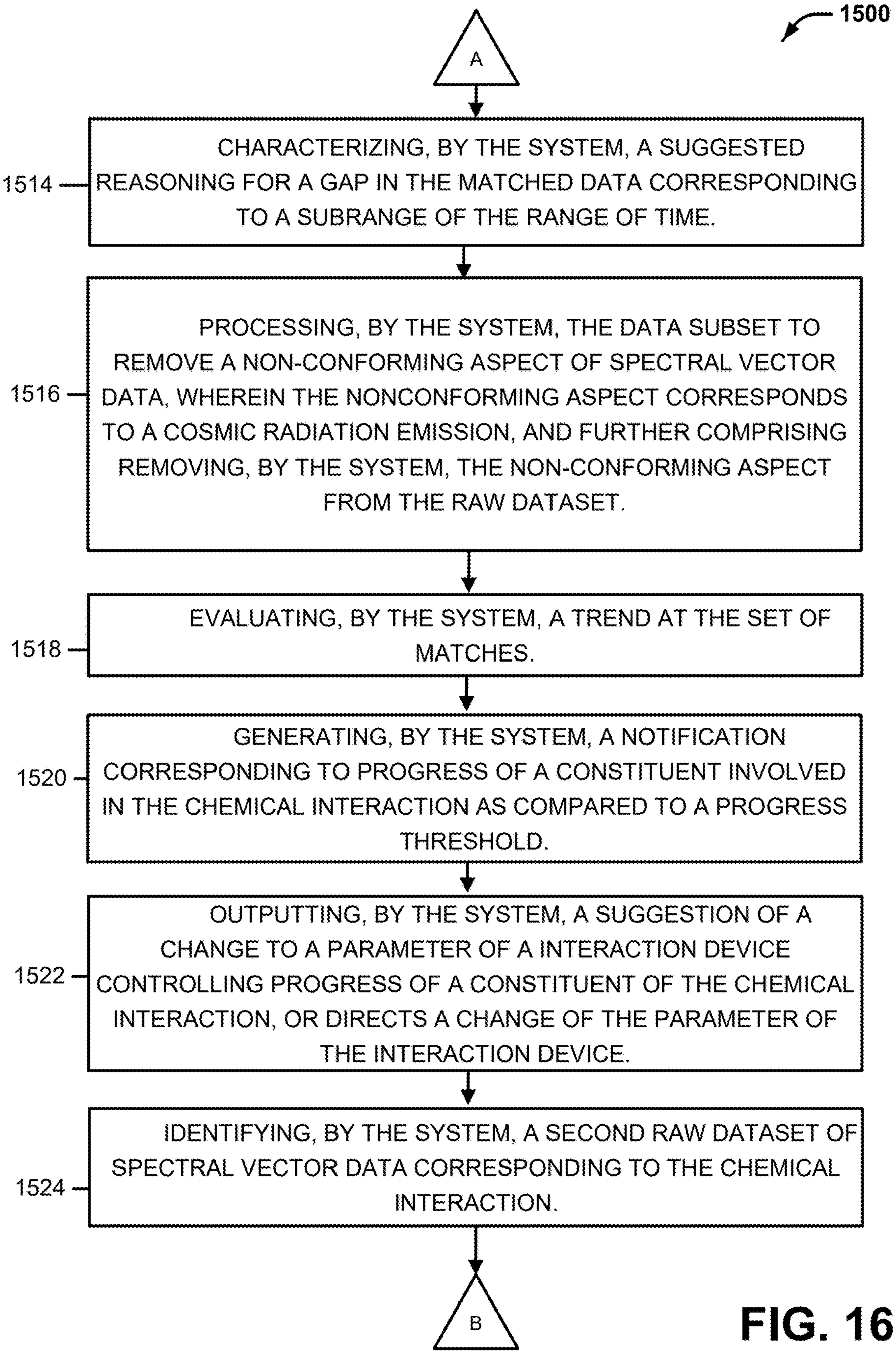
FIG. 16 illustrates a continuation of the flow diagram of FIG. 15 of the one or more processes that can be performed by the chemical interaction monitoring system of FIG. 12, in accordance with one or more embodiments described herein.
Figure 17:
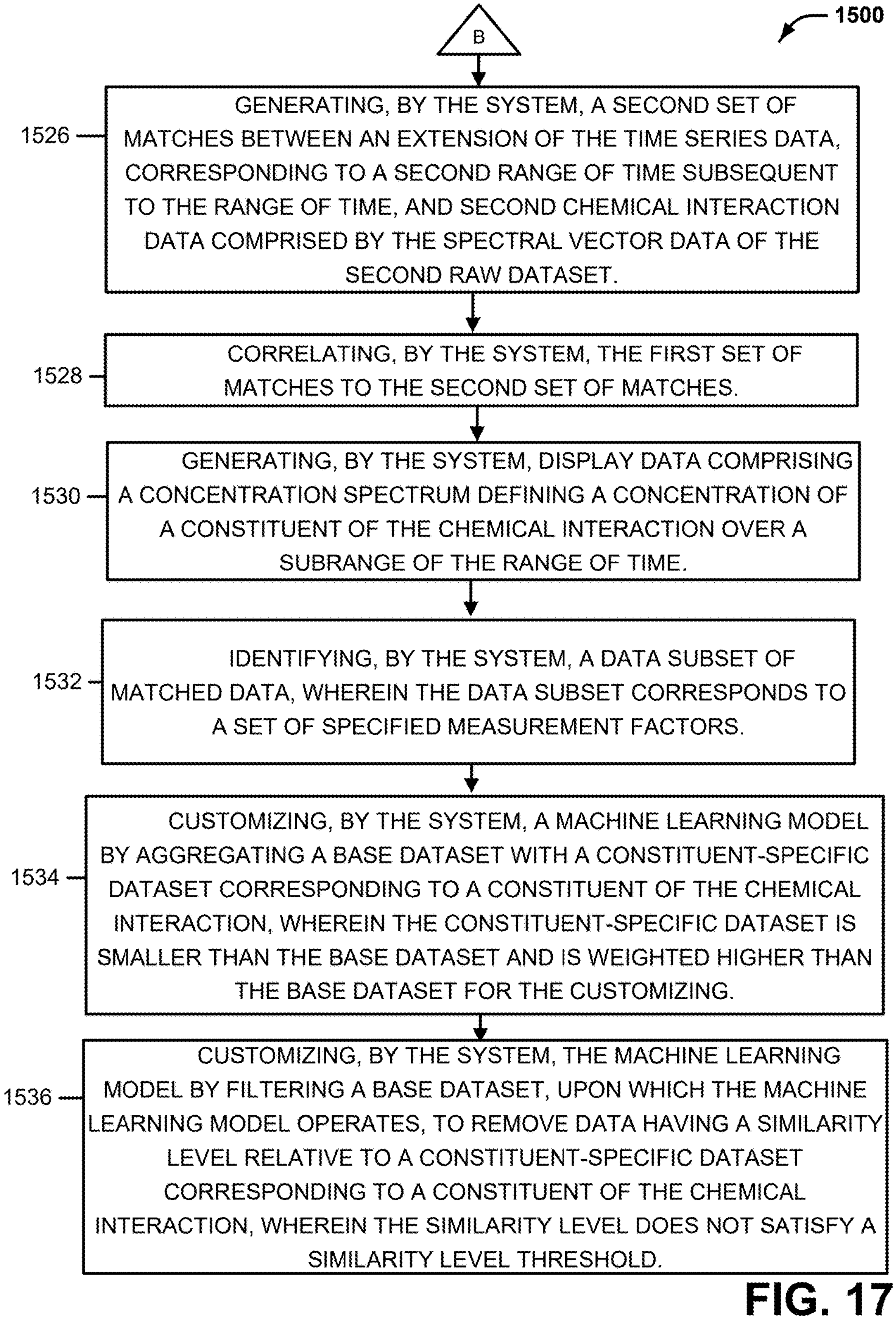
FIG. 17 illustrates a continuation of the flow diagram of FIG. 16 of the one or more processes that can be performed by the chemical interaction monitoring system of FIG. 12, in accordance with one or more embodiments described herein.

As another summary of the above-described components and functions thereof, referring next to FIGS. 15 to 17, illustrated is a flow diagram of an example, non-limiting method 1600 that can facilitate a process for chemical interaction monitoring, in accordance with one or more embodiments described herein, such as the non-limiting system 1200 of FIG. 12. While the non-limiting method 1500 is described relative to the non-limiting system 1200 of FIG. 12, the non-limiting method 1500 can be applicable also to other systems described herein, such as the non-limiting system 1100 of FIG. 11. Repetitive description of like elements and/or processes employed in respective embodiments is omitted for sake of brevity.

At 1502, the non-limiting method 1500 can comprise identifying, by a system operatively coupled to a processor, a raw dataset of spectral vector data corresponding to a chemical interaction.

In one or more embodiments, the spectral vector data corresponds to Raman spectroscopy readings obtained using an excitation beam.

At 1504, the non-limiting method 1500 can comprise determining, by the system, if a subset of the raw dataset corresponds to a subset of time series data. If no, the non-limiting method 1500 can proceed back to step 1502 for re-executing the identifying action. If yes, the non-limiting method 1500 can proceed forward to step 1506.

At 1506, the non-limiting method 1500 can comprise generating, by the system, matched data comprising the set of matches based on a specified time zone setting comprising a change in time due to daylight savings time.

At 1508, the non-limiting method 1500 can comprise generating, by the system, the matched data based on a specified time zone setting comprising a change in time due to daylight savings time.

At 1510, the non-limiting method 1500 can comprise generating, by the system, the matched data based on a spectroscopy setting, wherein the spectroscopy setting corresponds to a spectroscopy device having been employed to generate the raw dataset of spectral vector data.

At 1512, the non-limiting method 1500 can comprise normalizing, by the system, matched data, resulting from the generating of the set of matches, by averaging together two or more spectral vectors, from the raw dataset, which are consecutively ordered by time over a subrange of the range of time.

At 1514, the non-limiting method 1500 can comprise characterizing, by the system, a suggested reasoning for a gap in the matched data corresponding to a subrange of the range of time.

At 1516, the non-limiting method 1500 can comprise processing, by the system, the data subset to remove a non-conforming aspect of spectral vector data, wherein the nonconforming aspect corresponds to a cosmic radiation emission, and further comprising removing, by the system, the non-conforming aspect from the raw dataset.

At 1518, the non-limiting method 1500 can comprise evaluating, by the system, a trend at the set of matches.

At 1520, the non-limiting method 1500 can comprise generating, by the system, a notification corresponding to progress of a constituent involved in the chemical interaction as compared to a progress threshold.

At 1522, the non-limiting method 1500 can comprise outputting, by the system, a suggestion of a change to a parameter of an interaction device controlling progress of a constituent of the chemical interaction, or directs a change of the parameter of the interaction device.

At 1524, the non-limiting method 1500 can comprise identifying, by the system, a second raw dataset of spectral vector data corresponding to the chemical interaction.

At 1526, the non-limiting method 1500 can comprise generating, by the system, a second set of matches between an extension of the time series data, corresponding to a second range of time subsequent to the range of time, and second chemical interaction data comprised by the spectral vector data of the second raw dataset.

At 1528, the non-limiting method 1500 can comprise correlating, by the system, the first set of matches to the second set of matches.

At 1530, the non-limiting method 1500 can comprise generating, by the system, display data comprising a concentration spectrum defining a concentration of a constituent of the chemical interaction over a subrange of the range of time.

At 1532, the non-limiting method 1500 can comprise identifying, by the system, a data subset of the matched data, wherein the data subset corresponds to a set of specified measurement factors.

At 1534, the non-limiting method 1500 can comprise customizing, by the system, the machine learning model by aggregating a base dataset with a constituent-specific dataset corresponding to a constituent of the chemical interaction, wherein the constituent-specific dataset is smaller than the base dataset and is weighted higher than the base dataset for the customizing.

At 1536, the non-limiting method 1500 can comprise customizing, by the system, the machine learning model by filtering a base dataset, upon which the machine learning model operates, to remove data having a similarity level relative to a constituent-specific dataset corresponding to a constituent of the chemical interaction, wherein the similarity level does not satisfy a similarity level threshold.

Additional Summary

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, computer program products and/or computer-implemented methods provided herein relate to a process for chemical interaction monitoring, such as employing data output from a Raman spectroscopy system relative to a composition undergoing the chemical interaction in a bioreactor. A system can comprise a memory that stores, and a processor that executes, computer executable components. The computer executable components can comprise an identifying component that identifies a raw dataset of spectral vector data corresponding to a chemical interaction, and a matching component that generates matched data comprising a set of matches between time series data, corresponding to a range of time over which the chemical interaction was observed, and chemical interaction data comprised by the spectral vector data of the raw dataset.

The one or more embodiments disclosed herein can achieve improved performance relative to existing approaches. For example, with respect to large quantities of spectral vector data, or even continuous and/or nearly continuous writing of spectral vector data, such raw data can be automatically organized to match corresponding time series data. That is, manual matching of data and correlating of time changes, spectral vector data gaps, and/or the like can instead be performed automatically and more rapidly allowing for in process (e.g., real-time) adjustment to the chemical interaction.

That is, the one or more embodiments disclosed herein can allow for active monitoring and/or actively adjusting and/or suggesting of adjusting of a chemical interaction being monitored (e.g., corresponding to the spectral vector data), as compared to passive monitoring of low frequency based spectral vector data (e.g., limited, spaced apart data gathering and/or evaluation).

As a result of use of the one or more embodiments described herein, continuous data can be matched and evaluated prior to a negative change in the chemical interaction being monitored. That is, due to the automatic, fast, and efficient time series data matching performed by the one or more embodiments described herein, a chemical interaction trajectory can be proactively controlled rather than reactively controlled.

Using the one or more embodiments described herein, use of a specialized domain, or requirement for domain knowledge, to perform manual time series matching can be made moot due to that the raw data can be automatically organized to match corresponding time series data.

In one or more cases, the one or more embodiments described herein can provide artificial intelligence (AI) optimization for processing (e.g., including evaluating) the matched data resulting from the matching. This AI optimization can be streamlined relative to a specified chemical interaction through various processes comprising, but not limited to, subsetting of base data underlying the AI optimization and/or transfer training of a machine learning (ML) model, or other model type, being employed to facilitate the AI optimization.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to time series data matching and analysis allowing for proactive chemical interaction trajectory adjustment, as compared to existing systems and/or techniques using manual and/or other existing methods. Systems, computer-implemented methods and/or computer program products providing performance of these processes are of great utility in the fields of chemical interaction monitoring and/or analysis and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively perform time series data matching and analysis allowing for proactive chemical interaction trajectory adjustment, as compared to existing systems and/or techniques using manual and/or other existing methods, as the one or more embodiments described herein can provide this process. Moreover, neither can the human mind nor a human with pen and paper conduct one or more of these processes, as conducted by one or more embodiments described herein.

Indeed, relative to continuous generating of spectral vector data, where manual time series matching cannot keep up with the generating of the spectral vector data, existing and manual methods may at most allow for spot monitoring (e.g., limited monitoring rather than continuous monitoring). In such cases, data between monitoring times (e.g., within the valleys of a frequency graph of the monitoring) can be missed, causing incomplete and/or inaccurate analysis of the chemical interaction. As such, an adjustment taken relative to such incomplete and/or inaccurate analysis can cause further exacerbation of issues by cause a chemical interaction to be improperly and/or undesirably adjusted.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A system, comprising: a memory that stores computer executable components; and a processor that executes the computer executable components stored in the memory, wherein the computer executable components comprise: an identifying component that identifies a raw dataset of spectral vector data corresponding to a chemical interaction; and a matching component that generates matched data comprising a set of matches between time series data, corresponding to a range of time over which the chemical interaction was observed, and chemical interaction data comprised by the spectral vector data of the raw dataset.

The system of the preceding paragraph, wherein the spectral vector data corresponds to Raman spectroscopy readings obtained using an excitation beam.

The system of any preceding paragraph, wherein the matching component generates the matched data based on a specified time zone setting comprising a change in time due to daylight savings time.

The system of any preceding paragraph, wherein the matching component generates the matched data based on a spectroscopy setting, wherein the spectroscopy setting corresponds to a spectroscopy device having been employed to generate the raw dataset of spectral vector data.

The system of any preceding paragraph, wherein the computer executable components further comprise: a processing component that normalizes the matched data by averaging together two or more spectral vectors, from the raw dataset, which are consecutively ordered by time over a subrange of the range of time.

The system of any preceding paragraph, wherein the computer executable components further comprise: a processing component that normalizes the matched data by summing together two or more spectral vectors, from the raw dataset, which are consecutively ordered by time over a subrange of the range of time.

The system of any preceding paragraph, wherein the computer executable components further comprise: a processing component that characterizes a suggested reasoning for a gap in the matched data corresponding to a subrange of the range of time.

The system of any preceding paragraph wherein the matched data comprises spectral vector data of the raw dataset, and wherein the computer executable components further comprise: a processing component that processes the matched data to remove a non-conforming aspect of the spectral vector data, wherein the non-conforming aspect of the spectral vector data corresponds to a cosmic radiation emission, and wherein the processing component removes the non-conforming aspect from the raw dataset.

The system of any preceding paragraph, wherein the computer executable components further comprise: a processing component that processes the data subset to remove a non-conforming aspect of spectral vector data, of the raw dataset, corresponding to a spectral vector baseline caused by fluorescence of a constituent involved in the chemical interaction, or corresponding to a cosmic radiation emission, wherein the processing component removes the non-conforming aspect from the raw dataset.

The system of any preceding paragraph, further comprising: an evaluating component that evaluates a trend at the set of matches; and a notifying component that generates a notification corresponding to progress of a constituent involved in the chemical interaction as compared to a progress threshold.

The system of any preceding paragraph, wherein the computer executable components further comprise: an adjusting component that, based on the generating of the set of matches, outputs a suggestion of a change to a parameter of a reaction device controlling progress of a constituent of the chemical interaction, or directs a change of the parameter of the reaction device.

The system of any preceding paragraph, wherein the identifying component further identifies a second raw dataset of spectral vector data corresponding to the chemical interaction, wherein the matching component generates a second set of matches between an extension of the time series data, corresponding to a second range of time subsequent to the range of time, and second chemical interaction data comprised by the spectral vector data of the second raw dataset, and wherein the computer executable components further comprise an evaluating component that correlates the first set of matches to the second set of matches.

A computer-implemented method, comprising: identifying, by a system operatively coupled to a processor, a raw dataset of spectral vector data corresponding to a chemical interaction; and generating, by the system, matched data comprising a set of matches between time series data, corresponding to a range of time over which the chemical interaction was observed, and chemical interaction data comprised by the spectral vector data of the raw dataset.

The computer-implemented method of the preceding paragraph, wherein the spectral vector data corresponds to Raman spectroscopy readings obtained using an excitation beam, and wherein the generating the matched data is executed based on a specified time zone setting.

The computer-implemented method of any preceding paragraph, further comprising: generating, by the system, display data comprising a concentration spectrum defining a concentration of a constituent of the chemical interaction over a subrange of the range of time.

The computer-implemented method of any preceding paragraph, further comprising: normalizing, by the system, the matched data by averaging together two or more spectral vectors, from the raw dataset, which are consecutively ordered by time over a subrange of the range of time.

The computer-implemented method of any preceding paragraph, further comprising: identifying, by a machine learning model, a data subset of the matched data, wherein the data subset corresponds to a set of specified measurement factors.

The computer-implemented method of any preceding paragraph, further comprising: customizing, by the system, the machine learning model by aggregating a base dataset with a constituent-specific dataset corresponding to a constituent of the chemical interaction, wherein the constituent-specific dataset is smaller than the base dataset and is weighted higher than the base dataset for the customizing.

The computer-implemented method of any preceding paragraph, further comprising: customizing, by the system, the machine learning model by filtering a base dataset, upon which the machine learning model operates, to remove data having a similarity level relative to a constituent-specific dataset corresponding to a constituent of the chemical interaction, wherein the similarity level does not satisfy a similarity level threshold.

A computer program product facilitating a process for chemical interaction monitoring, the computer program product comprising a computer readable storage medium having program instructions embodied therewith, and the program instructions executable by a processor to cause the processor to: identify, by the processor, a raw dataset of spectral vector data corresponding to a chemical interaction; and generate, by the processor, matched data comprising a set of matches between time series data, corresponding to a range of time over which the chemical interaction was observed, and chemical interaction data comprised by the spectral vector data of the raw dataset.

The computer program product of the preceding paragraph, wherein the spectral vector data corresponds to Raman spectroscopy readings obtained using an excitation beam, and wherein the generating the matched data is executed based on a specified time zone setting.

The computer program product of any preceding paragraph, wherein the program instructions are further executable by the processor to cause the processor to: normalize, by the processor, the matched data by averaging together two or more spectral vectors, from the raw dataset, which are consecutively ordered by time over a subrange of the range of time.

Scientific Instrument System Description

Turning next to FIG. 18, a detailed description is provided of additional context for the one or more embodiments described herein at FIGS. 1-17. One or more computing devices implementing any of the scientific instrument modules or methods disclosed herein can be part of a scientific instrument system. FIG. 18 illustrates a block diagram of an example scientific instrument system 1800 in which one or more of the scientific instrument methods or other methods disclosed herein can be performed, in accordance with various embodiments described herein. The scientific instrument modules and methods disclosed herein (e.g., the scientific instrument module 100 of FIG. 1 and the method 200 of FIG. 2) can be implemented by one or more of the scientific instrument 1810, the user local computing device 1820, the service local computing device 1830, and/or the remote computing device 1840 of the scientific instrument system 1800.

Any of the scientific instrument 1810, the user local computing device 1820, the service local computing device 1830, and/or the remote computing device 1840 can include any of the embodiments of the computing device 400 discussed herein with reference to FIG. 4, and any of the scientific instrument 1810, the user local computing device 1820, the service local computing device 1830, and/or the remote computing device 1840 can take the form of any appropriate one or more of the embodiments of the computing device 400 discussed herein with reference to FIG. 4.

One or more of the scientific instrument 1810, the user local computing device 1820, the service local computing device 1830, and/or the remote computing device 1840 can include a processing device 1802, a storage device 1804, and/or an interface device 1806. The processing device 1802 can take any suitable form, including the form of any of the processors 402 discussed herein with reference to FIG. 4. The processing devices 1802 included in different ones of the scientific instrument 1810, the user local computing device 1820, the service local computing device 1830, and/or the remote computing device 1840 can take the same form or different forms. The storage device 1804 can take any suitable form, including the form of any of the storage devices 404 discussed herein with reference to FIG. 4. The storage devices 1804 included in different ones of the scientific instrument 1810, the user local computing device 1820, the service local computing device 1830, and/or the remote computing device 1840 can take the same form or different forms. The interface device 1806 can take any suitable form, including the form of any of the interface devices 406 discussed herein with reference to FIG. 4. The interface devices 1806 included in different ones of the scientific instrument 1810, the user local computing device 1820, the service local computing device 1830, and/or the remote computing device 1840 can take the same form or different forms.

The scientific instrument 1810, the user local computing device 1820, the service local computing device 1830, and/or the remote computing device 1840 can be in communication with other elements of the scientific instrument system 1800 via communication pathways 1808. The communication pathways 1808 can communicatively couple the interface devices 1806 of different ones of the elements of the scientific instrument system 1800, as shown, and can be wired or wireless communication pathways (e.g., in accordance with any of the communication techniques discussed herein with reference to the interface devices 406 of the computing device 400 of FIG. 4). The particular scientific instrument system 1800 depicted in FIG. 18 includes communication pathways between each pair of the scientific instrument 1810, the user local computing device 1820, the service local computing device 1830, and the remote computing device 1840, but this "fully connected" implementation is simply illustrative, and in various embodiments, various ones of the communication pathways 1808 can be omitted. For example, in one or more embodiments, a service local computing device 1830 can omit a direct communication pathway 1808 between its interface device 1806 and the interface device 1806 of the scientific instrument 1810, but can instead communicate with the scientific instrument 1810 via the communication pathway 1808 between the service local computing device 1830 and the user local computing device 1820 and/or the communication pathway 1808 between the user local computing device 1820 and the scientific instrument 1810.

The scientific instrument 1810 can include any appropriate scientific instrument, such as a separation or MS instrument, or other instrument facilitating material analysis.

The user local computing device 1820 can be a computing device (e.g., in accordance with any of the embodiments of the computing device 400 discussed herein) that is local to a user of the scientific instrument 1810. In one or more embodiments, the user local computing device 1820 can also be local to the scientific instrument 1810, but this need not be the case; for example, a user local computing device 1820 that is associated with a home, office or other building associated with a user entity can be remote from, but in communication with, the scientific instrument 1810 so that the user entity can use the user local computing device 1820 to control and/or access data from the scientific instrument 1810. In one or more embodiments, the user local computing device 1820 can be a laptop, smartphone, or tablet device. In one or more embodiments the user local computing device 1820 can be a portable computing device. In one or more embodiments, the user local computing device 1820 can deployed in the field.

The service local computing device 1830 can be a computing device (e.g., in accordance with any of the embodiments of the computing device 400 discussed herein) that is local to an entity that services the scientific instrument 1810. For example, the service local computing device 1830 can be local to a manufacturer of the scientific instrument 1810 or to a third-party service company. In one or more embodiments, the service local computing device 1830 can communicate with the scientific instrument 1810, the user local computing device 1820, and/or the remote computing device 1840 (e.g., via a direct communication pathway 1808 or via multiple "indirect" communication pathways 1808, as discussed above) to receive data regarding the operation of the scientific instrument 1810, the user local computing device

1820, and/or the remote computing device 1840 (e.g., the results of self-tests of the scientific instrument 1810, calibration coefficients used by the scientific instrument 1810, the measurements of sensors associated with the scientific instrument 1810, etc.). In one or more embodiments, the service local computing device 1830 can communicate with the scientific instrument 1810, the user local computing device 1820, and/or the remote computing device 1840 (e.g., via a direct communication pathway 1808 or via multiple "indirect" communication pathways 1808, as discussed above) to transmit data to the scientific instrument 1810, the user local computing device 1820, and/or the remote computing device 1840 (e.g., to update programmed instructions, such as firmware, in the scientific instrument 1810, to initiate the performance of test or calibration sequences in the scientific instrument 1810, to update programmed instructions, such as software, in the user local computing device 1820 or the remote computing device 1840, etc.). A user entity of the scientific instrument 1810 can utilize the scientific instrument 1810 or the user local computing device 1820 to communicate with the service local computing device 1830 to report a problem with the scientific instrument 1810 or the user local computing device 1820, to request a visit from a technician to improve the operation of the scientific instrument 1810, to order consumables or replacement parts associated with the scientific instrument 1810, or for other purposes.

The remote computing device 1840 can be a computing device (e.g., in accordance with any of the embodiments of the computing device 400 discussed herein) that is remote from the scientific instrument 1810 and/or from the user local computing device 1820. In one or more embodiments, the remote computing device 1840 can be included in a datacenter or other large-scale server environment. In one or more embodiments, the remote computing device 1840 can include network-attached storage (e.g., as part of the storage device 1804). The remote computing device 1840 can store data generated by the scientific instrument 1810, perform analyses of the data generated by the scientific instrument 1810 (e.g., in accordance with programmed instructions), facilitate communication between the user local computing device 1820 and the scientific instrument 1810, and/or facilitate communication between the service local computing device 1830 and the scientific instrument 1810.

In one or more embodiments, one or more of the elements of the scientific instrument system 1800 illustrated in FIG. 18 can be omitted. Further, in one or more embodiments, multiple ones of various ones of the elements of the scientific instrument system 1800 of FIG. 18 can be present. For example, a scientific instrument system 1800 can include multiple user local computing devices 1820 (e.g., different user local computing devices 1820 associated with different user entities or in different locations). In another example, a scientific instrument system 1800 can include multiple scientific instruments 1810, all in communication with service local computing device 1830 and/or a remote computing device 1840; in such an embodiment, the service local computing device 1830 can monitor these multiple scientific instruments 1810, and the service local computing device 1830 can cause updates or other information can be "broadcast" to multiple scientific instruments 1810 at the same time. Different ones of the scientific instruments 1810 in a scientific instrument system 1800 can be located close to one another (e.g., in the same room) or farther from one another (e.g., on different floors of a building, in different buildings, in different cities, etc.). In one or more embodiments, a scientific instrument 1810 can be connected to an Internet-of-Things (IoT) stack that allows for command and control of the scientific instrument 1810 through a web-based application, a virtual or augmented reality application, a mobile application, and/or a desktop application. Any of these applications can be accessed by a user entity operating the user local computing device 1820 in communication with the scientific instrument 1810 by the intervening remote computing device 1840. In one or more embodiments, a scientific instrument 1810 can be sold by the manufacturer along with one or more associated user local computing devices 1820 as part of a local scientific instrument computing unit 1812.

In one or more embodiments, different ones of the scientific instruments 1810 included in a scientific instrument system 1800 can be different types of scientific instruments 1810; for example, one scientific instrument 1810 can be an EDS device, while another scientific instrument 1810 can be an analysis device that analyzes results of an EDS device. In some such embodiments, the remote computing device 1840 and/or the user local computing device 1820 can combine data from different types of scientific instruments 1810 included in a scientific instrument system 1800.

Example Operating Environment

FIG. 19 is a schematic block diagram of an operating environment 1900 with which the described subject matter can interact. The operating environment 1900 comprises one or more remote component(s) 1910. The remote component(s) 1910 can be hardware and/or software (e.g., threads, processes, computing devices). In one or more embodiments, remote component(s) 1910 can be a distributed computer system, connected to a local automatic scaling component and/or programs that use the resources of a distributed computer system, via communication framework 1940. Communication framework 1940 can comprise wired network devices, wireless network devices, mobile devices, wearable devices, radio access network devices, gateway devices, femtocell devices, servers, etc.

The operating environment 1900 also comprises one or more local component(s) 1920. The local component(s) 1920 can be hardware and/or software (e.g., threads, processes, computing devices). In one or more embodiments, local component(s) 1920 can comprise an automatic scaling component and/or programs that communicate/use the remote resources 1910 and 1920, etc., connected to a remotely located distributed computing system via communication framework 1940.

One possible communication between a remote component(s) 1910 and a local component(s) 1920 can be in the form of a data packet adapted to be transmitted between two or more computer processes. Another possible communication between a remote component(s) 1910 and a local component(s) 1920 can be in the form of circuit-switched data adapted to be transmitted between two or more computer processes in radio time slots. The operating environment 1900 comprises a communication framework 1940 that can be employed to facilitate communications between the remote component(s) 1910 and the local component(s) 1920, and can comprise an air interface, e.g., interface of a UMTS network, via an LTE network, etc. Remote component(s) 1910 can be operably connected to one or more remote data store(s) 1950, such as a hard drive, solid state drive, subscriber identity module (SIM) card, electronic SIM (eSIM), device memory, etc., that can be employed to store information on the remote component(s) 1910 side of communication framework 1940. Similarly, local component(s) 1920 can be operably connected to one or more local data store(s) 1930, that can be employed to store information on the local component(s) 1920 side of communication framework 1940.

Example Computing Environment

In order to provide additional context for various embodiments described herein, FIG. 20 and the following discussion are intended to provide a brief, general description of a suitable computing environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 20, the example computing environment 2000 which can implement one or more embodiments described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), and can include one or more external storage devices 2016 (e.g., a magnetic floppy disk drive (FDD) 2016, a memory stick or flash drive reader, a memory card reader, etc.). While the internal HDD 2014 is illustrated as located within the computer 2002, the internal HDD 2014 can also be configured for external use in a suitable chassis (not shown). Additionally, while not shown in computing environment 2000, a solid-state drive (SSD) could be used in addition to, or in place of, an HDD 2014.

Other internal or external storage can include at least one other storage device 2020 with storage media 2022 (e.g., a solid-state storage device, a nonvolatile memory device, and/or an optical disk drive that can read or write from removable media such as a CD-ROM disc, a DVD, a BD, etc.). The external storage 2016 can be facilitated by a network virtual machine. The HDD 2014, external storage device 2016 and storage device (e.g., drive) 2020 can be connected to the system bus 2008 by an HDD interface 2024, an external storage interface 2026 and a drive interface 2028, respectively.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for applications 2032. Runtime environments are consistent execution environments that allow applications 2032 to run on any operating system that includes the runtime environment. Similarly, operating system 2030 can support containers, and applications 2032 can be in the form of containers, which are lightweight, standalone, executable packages of software that include, e.g., code, runtime, system tools, system libraries and settings for an application.

Further, computer 2002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user entity can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2046 or other type of display device can also be connected to the system bus 2008 via an interface, such as a video adapter 2048. In addition to the monitor 2046, a computer typically includes other peripheral output devices (not shown), such as speakers, printers, etc.

The computer 2002 can operate in a networked environment using logical connections via wired and/or wireless communications to one or more remote computers, such as a remote computer 2050. The remote computer 2050 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2052 is illustrated. The logical connections depicted include wired/wireless connectivity to a local area network (LAN) 2054 and/or larger networks, e.g., a wide area network (WAN) 2056. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2054 through a wired and/or wireless communication network interface or adapter 2058. The adapter 2058 can facilitate wired or wireless communication to the LAN 2054, which can also include a wireless access point (AP) disposed thereon for communicating with the adapter 2058 in a wireless mode.

When used in a WAN networking environment, the computer 2002 can include a modem 2060 or can be connected to a communications server on the WAN 2056 via other means for establishing communications over the WAN 2056, such as by way of the Internet. The modem 2060, which can be internal or external and a wired or wireless device, can be connected to the system bus 2008 via the input device interface 2044. In a networked environment, program modules depicted relative to the computer 2002 or portions thereof, can be stored in the remote memory/storage device 2052. The network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2054 or WAN 2056 e.g., by the adapter 2058 or modem 2060, respectively. Upon connecting the computer 2002 to an associated cloud storage system, the external storage interface 2026 can, with the aid of the adapter 2058 and/or modem 2060, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with an existing network or simply an ad hoc communication between at least two devices.

Additional Information

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments can use the phrases "an embodiment," "various embodiments," "one or more embodiments" and/or "some embodiments," each of which can refer to one or more of the same or different embodiments.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

The invention claimed is:

1. A system, comprising:

a memory that stores computer executable components; and a processor that executes at least one of the computer executable components that:

identifies a raw dataset corresponding to a chemical interaction being observed, wherein the raw dataset is measured using spectroscopy via a first instrument;

identifies time series data that is measured via a second instrument relative to the raw dataset;

generates, using respective metadata of the raw dataset and the time series data, matched data comprising a set of matches between the time series data and chemical interaction data, wherein the respective metadata comprises a first time-zone setting and first daylight-savings-time information associated with the raw dataset, and a second time-zone setting and second daylight-savings-time information associated the time series data, wherein the time series data corresponds to a range of time over which the chemical interaction was observed, and wherein the chemical interaction data is comprised by at least a portion of the raw dataset; and generates control output based on the matched data to change operation of an interaction device governing the chemical interaction.

2. The system of claim 1, wherein the raw dataset comprises spectral vector data corresponding to Raman spectroscopy readings obtained using an excitation beam on the chemical interaction.

3. The system of claim 1, wherein the at least one of the computer executable components further:

normalizes the matched data by summing together two or more spectral vectors of the raw dataset which are consecutively ordered by time over a subrange of the range of time.

4. The system of claim 1, wherein the at least one of the computer executable components further:

generates the matched data based on a spectroscopy setting, wherein the spectroscopy setting corresponds to a spectroscopy device of the first instrument.

5. The system of claim 1, wherein the at least one of the computer executable components further:

normalizes the matched data by averaging together two or more spectral vectors of the raw dataset which are consecutively ordered by time over a subrange of the range of time.

6. The system of claim 1, wherein the at least one of the computer executable components further:

characterizes a suggested reasoning for a gap in the matched data corresponding to a subrange of the range of time, the gap corresponding to an absence of chemical interaction data matched to a portion of the independently measured time series data and the suggested reasoning being based on other available information indicating at least one of a data gathering device being offline, a failure of the data gathering device to activate, loss of data, or corruption of data.

7. The system of claim 1, wherein the matched data comprises spectral vector data of the raw dataset, and wherein the at least one of the computer executable components further:

processes the matched data to remove a non-conforming aspect of the spectral vector data, wherein the non-conforming aspect of the spectral vector data corresponds to a cosmic radiation emission; and removes the non-conforming aspect from the raw dataset.

8. The system of claim 1, wherein the at least one of the computer executable components further:

evaluates a trend at the set of matches; and generates a notification corresponding to progress of a constituent involved in the chemical interaction as compared to a progress threshold.

9. The system of claim 1, wherein the at least one of the computer executable components further:

based on the generating of the set of matches, outputs a suggestion of a change to a parameter of a reaction device controlling progress of a constituent of the chemical interaction, or directs the change of the parameter of the reaction device.

10. The system of claim 1, wherein the set of matches is a first set of matches, and the at least one of the computer executable components further:

identifies a second raw dataset corresponding to the chemical interaction;

generates a second set of matches between an extension of the time series data and second chemical interaction data comprised by the second raw dataset, wherein the extension of the time series data corresponds to a second range of time subsequent to the range of time; and correlates the first set of matches to the second set of matches.

11. A computer-implemented method, comprising:

identifying, by a system operatively coupled to a processor, a raw dataset corresponding to a chemical interaction being observed, wherein the raw dataset is measured using spectroscopy via a first instrument;

identifying, by the system, time series data that is measured via a second instrument relative to the raw dataset;

generating, by the system, using respective metadata of the raw dataset and the time series data, matched data comprising a set of matches between the time series data and chemical interaction data, wherein the respective metadata comprises a first time-zone setting and first daylight-savings-time information associated with the raw dataset, and a second time-zone setting and second daylight-savings-time information associated the time series data, wherein the time series data corresponds to a range of time over which the chemical interaction was observed, and wherein the chemical interaction data is comprised by at least a portion of the raw dataset; and generating, by the system, control output based on the matched data to change operation of an interaction device governing the chemical interaction.

12. The computer-implemented method of claim 11, wherein the raw dataset comprises spectral vector data corresponding to Raman spectroscopy readings obtained using an excitation beam.

13. The computer-implemented method of claim 11, further comprising:

generating, by the system, display data comprising a concentration spectrum defining a concentration of a constituent of the chemical interaction over a subrange of the range of time, wherein the raw dataset comprises spectral vector data.

14. The computer-implemented method of claim 11, further comprising:

normalizing, by the system, the matched data by averaging together two or more spectral vectors of the raw dataset, wherein the two or more spectral vectors are consecutively ordered by time over a subrange of the range of time.

15. The computer-implemented method of claim 11, further comprising:

identifying, by the system, using a machine learning model, a data subset of the matched data for being aggregated, wherein the data subset corresponds to a set of specified measurement factors.

16. The computer-implemented method of claim 15, further comprising:

customizing, by the system, the machine learning model by aggregating a base dataset with a constituent-specific dataset corresponding to a constituent of the chemical interaction, wherein the constituent-specific dataset is smaller than the base dataset and is weighted higher than the base dataset for the customizing.

17. The computer-implemented method of claim 15, further comprising:

customizing, by the system, the machine learning model by filtering a base dataset, upon which the machine learning model operates, to remove data having a similarity level relative to a constituent-specific dataset corresponding to a constituent of the chemical interaction, wherein the similarity level does not satisfy a similarity level threshold.

18. A computer program product facilitating a process for chemical interaction monitoring, the computer program product comprising a computer readable storage medium having program instructions embodied therewith, and the program instructions executable by a processor to cause the processor to:

identify, by the processor, a raw dataset of spectral vector data corresponding to a chemical interaction being observed, wherein the raw dataset is measured using spectroscopy via a first instrument;

identify, by the processor, time series data that is measured via a second instrument relative to the raw dataset;

generate, by the processor, using respective metadata of the raw dataset and the time series data, matched data comprising a set of matches between the time series data and chemical interaction data, wherein the respective metadata comprises a first time-zone setting and first daylight-savings-time information associated with the raw dataset, and a second time-zone setting and second daylight-savings-time information associated the time series data, wherein the time series data corresponds to a range of time over which the chemical interaction was observed, and wherein the chemical interaction data is comprised by at least a portion of the raw dataset; and generate, by the processor, control output based on the matched data to change operation of an interaction device governing the chemical interaction.

19. The computer program product of claim 18, wherein the raw dataset comprises spectral vector data that corresponds to Raman spectroscopy readings obtained using an excitation beam.

20. The computer program product of claim 18, wherein the program instructions are further executable by the processor to cause the processor to:

normalize, by the processor, the matched data by averaging together two or more spectral vectors of the raw dataset, wherein the two or more spectral vectors are consecutively ordered by time over a subrange of the range of time.

* * * * *